US012521985B2

(12) United States Patent
Teranishi et al.

(10) Patent No.: US 12,521,985 B2
(45) Date of Patent: Jan. 13, 2026

(54) LIQUID EJECTION HEAD AND LIQUID EJECTION APPARATUS HAVING PITCH CONVERSION MEMBER

(71) Applicant: CANON KABUSHIKI KAISHA, Tokyo (JP)

(72) Inventors: Atsushi Teranishi, Kanagawa (JP); Naoko Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 18/228,247

(22) Filed: Jul. 31, 2023

(65) Prior Publication Data

US 2024/0042756 A1 Feb. 8, 2024

(30) Foreign Application Priority Data

Aug. 3, 2022 (JP) ................................ 2022-124087

(51) Int. Cl.
*B41J 2/07* (2006.01)
*B41J 2/14* (2006.01)
*B41J 2/175* (2006.01)

(52) U.S. Cl.
CPC . *B41J 2/07* (2013.01); *B41J 2/14* (2013.01); *B41J 2/14024* (2013.01); *B41J 2/1404* (2013.01); *B41J 2/14145* (2013.01); *B41J 2/175* (2013.01); *B41J 2002/14467* (2013.01); *B41J 2202/12* (2013.01); *B41J 2202/20* (2013.01)

(58) Field of Classification Search
CPC ....... B41J 2/07; B41J 2/14; B41J 2/175; B41J 2002/14467; B41J 2202/12; B41J 2202/20; B41J 2/14024; B41J 2/1404; B41J 2/14145
See application file for complete search history.

(56) References Cited

U.S. PATENT DOCUMENTS 11,660,867 B2 5/2023 Takagi et al.
2015/0210074 A1* 7/2015 Chen ...................... B41J 2/1433 347/44
2019/0100024 A1* 4/2019 Yamada ................... B41J 2/165

FOREIGN PATENT DOCUMENTS

WO 2014-028022 A1 2/2014

* cited by examiner

*Primary Examiner* — Henok D Legesse
(74) *Attorney, Agent, or Firm* — Venable LLP

(57) ABSTRACT

A liquid ejection head that is more reliable than conventional heads includes a pitch conversion member. The pitch conversion member includes a plurality of first openings respectively connected to a plurality of first channels, and a plurality of second openings respectively connected to a plurality of second channels. A region where a plurality of the first openings are provided and a region where a plurality of the second openings are provided overlap as viewed from a penetration direction of the first openings and the second openings. A first distance in a second array direction between the two first openings closest to each other in the second array direction intersecting a first array direction is shorter than a second distance in the second array direction between the two second openings closest to each other in the second array direction.

13 Claims, 13 Drawing Sheets

LIQUID EJECTION HEAD AND LIQUID EJECTION APPARATUS HAVING PITCH CONVERSION MEMBER

BACKGROUND

Field of the Disclosure

The present disclosure relates to a liquid ejection head and a liquid ejection apparatus.

Description of the Related Art

In general, a liquid ejection head capable of ejecting liquid includes a print element substrate capable of ejecting liquid and in which a plurality of channels are formed and a channel member in which a plurality of channels coupled to respective channels of the print element substrate are formed. In the case of coupling the channels of the print element substrate to the respective channels of the channel member, the channels in the print element substrate are often arrayed at intervals shorter than intervals at which the channels in the channel member are arrayed. Thus, it is necessary to convert intervals (also referred to as an "array pitch") at which the channels of the channel member are arrayed into the array pitch of the channels of the print element substrate.

As a channel that realizes the above array pitch conversion, International Publication No. 2014/028022 discloses fan-out channels in which a channel formed outside a channel formed in the central portion of a channel member has a larger tilt angle with respect to a bonding surface with a print head.

In recent years, due to demand for reduction in manufacturing costs, the sizes of print element substrates have been further reduced, and a pitch conversion rate (that is, an array pitch reduction rate) has been further increased.

In the situation described above, in the configuration of International Publication No. 2014/028022, the fan-out channel provided on the outer side has a larger tilt angle. For this reason, even in the case of trying to release an air bubble generated for some reason through the inside of the fan-out channel, the air bubble hits against the inner wall of the fan-out channel, and it is difficult to quickly release the air bubble. Therefore, in the configuration of International Publication No. 2014/028022, defective liquid ejection due to the air bubble may occur.

Thus, an object of the present disclosure is to provide a liquid ejection head that is more reliable than conventional ones.

SUMMARY

In order to achieve the object, a liquid ejection head according to the present disclosure is configured to eject liquid and includes a print element substrate including a plurality of first channels, a channel member including a plurality of second channels, and a pitch conversion member arranged between the print element substrate and the channel member to convert a first array pitch in a first array direction of the plurality of first channels into a second array pitch in the first array direction of the plurality of second channels, wherein the pitch conversion member includes a plurality of first openings respectively connected to the plurality of first channels, and a plurality of second openings respectively connected to the plurality of second channels, wherein a region where a plurality of the first openings are provided and a region where a plurality of the second openings are provided overlap as viewed from a penetration direction of the first openings and the second openings, and wherein a first distance in a second array direction between the two first openings closest to each other in the second array direction intersecting the first array direction is shorter than a second distance in the second array direction between the two second openings closest to each other in the second array direction.

Further features of the present disclosure will become apparent from the following description of exemplary embodiments with reference to the attached drawings.

DESCRIPTION OF THE EMBODIMENTS

Embodiments of the present disclosure will be described below with reference to the drawings. However, the following description does not limit the scope of the present disclosure. For example, in the following embodiments, although a thermal method for generating an air bubble using a heating element to eject liquid is adopted, the present disclosure can also be applied to a liquid ejection head into which a piezoelectric method or various other liquid ejection methods are adopted.

Incidentally, the liquid ejection head that ejects liquid such as ink of the present disclosure is applicable to apparatuses such as a printer, a copier, a facsimile machine with a communication system, and a word processor with a printer unit and further to an industrial printing apparatus complexly combined with various processing apparatuses. For example, the liquid ejection head can be used for applications such as biochip production, electronic circuit printing, semiconductor substrate production, and 3D printers.

A liquid ejection apparatus according to the following embodiments is an inkjet printing apparatus (printing apparatus) in which liquid such as ink is circulated between a tank and a liquid ejection head, but may be in another form.

For example, the liquid may contain no colorant. Further, two tanks may be provided on the upstream side and the downstream side of the liquid ejection head to flow ink from one tank to the other tank without circulating the ink, thereby causing ink in a pressure chamber to flow.

First Embodiment

[Description of a Liquid Ejection Apparatus]

Figure 1A:
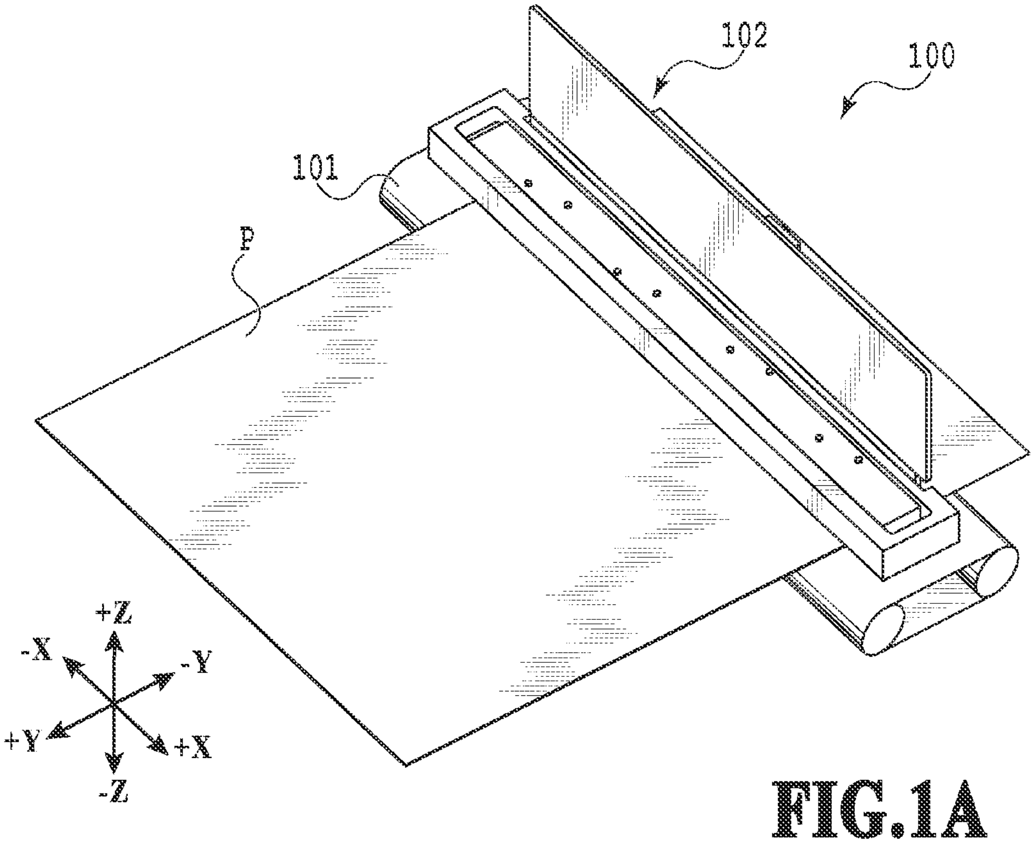
FIGS. 1A and 1B are diagrams showing a schematic configuration of a liquid ejection apparatus according to one embodiment.
Figure 1B:
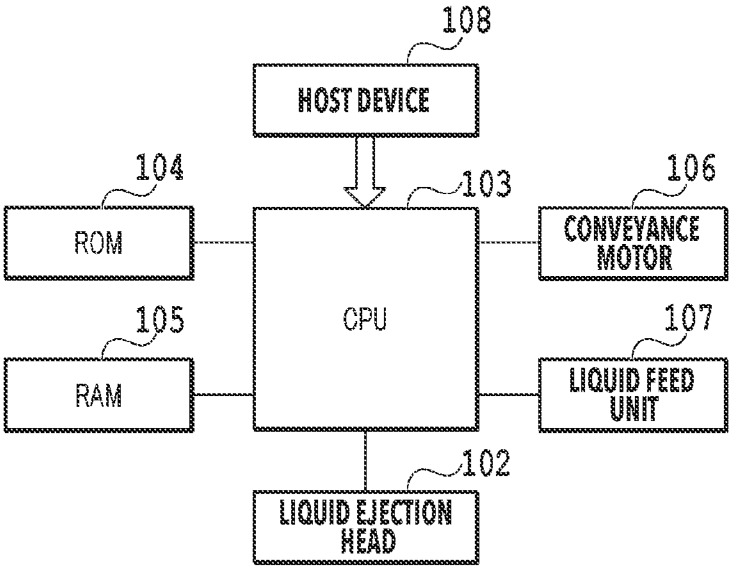

FIGS. 1A and 1B are diagrams showing a schematic configuration of an apparatus that can use a liquid ejection head 102 according to the present embodiment, specifically, a liquid ejection apparatus 100 that ejects ink to perform printing. FIG. 1A is a schematic perspective view of the liquid ejection apparatus 100 according to the present embodiment. As shown in FIG. 1A, the liquid ejection apparatus 100 includes a conveyance unit 101 that conveys a print medium P and a line-type liquid ejection head 102 that is arranged substantially orthogonally to a conveyance direction in which the print medium P is conveyed.

In the present embodiment, the longitudinal direction of the liquid ejection head 102 is a ±X direction. Additionally, a direction orthogonal to the longitudinal direction of the liquid ejection head 102 on a plane is a Y direction. Incidentally, the conveyance direction in which the liquid ejection head 102 conveys the print medium P is a +Y direction. On the other hand, a direction opposite to the conveyance direction is a −Y direction. A left direction as viewed in a case of facing in the −Y direction is a −X direction. A direction opposite to the −X direction is a +X direction. The direction of gravity (downward direction) is a −Z direction, and the direction of anti-gravity (upward direction) is a +Z direction. Hereinafter, a −Z direction side will be referred to as a "bottom surface side" and a +Z direction side will be referred to as an "upper surface side" as appropriate.

The liquid ejection apparatus 100 is a line-type printing apparatus that performs continuous printing in one pass while conveying a plurality of print media P continuously or intermittently. The print medium P is conveyed in the conveyance direction (that is, the +Y direction) substantially orthogonal to its own width direction. The print medium P is not limited to cut paper. The print medium P may be continuous roll paper.

The liquid ejection head 102 is capable of full-color printing using four colors of YMCK (yellow, magenta, cyan, and black) inks. The liquid ejection head 102 is coupled to a liquid supply unit, which is a supply path for supplying the liquid ejection head 102 with liquid, a main tank (not shown), and a buffer tank (not shown).

The liquid ejection apparatus 100 is a liquid ejection apparatus in which liquid such as ink is circulated between a tank and the liquid ejection head 102. A liquid channel in the liquid ejection head 102 will be described later. The liquid ejection head 102 is electrically connected to an electric control unit (not shown) that transmits electric power and an ejection control signal to the liquid ejection head 102.

FIG. 1B is a block diagram showing a control configuration of the liquid ejection apparatus 100 according to the present embodiment. As shown in FIG. 1B, the liquid ejection apparatus 100 includes a CPU 103, a ROM 104, a RAM 105, a conveyance motor 106, and a liquid feed unit 107 in addition to the features described above. The CPU 103 comprehensively controls each unit of the liquid ejection apparatus 100 while using the RAM 105 as a work area in accordance with a program stored in the ROM 104. For example, the CPU 103 performs predetermined image processing of image data received from a host device 108 connected to the outside in accordance with the program and parameters stored in the ROM 104 and generates ejection data for driving the liquid ejection head 102. The CPU 103 drives the liquid ejection head 102 in accordance with the ejection data to cause ink ejection at a predetermined frequency. The CPU 103 also drives the conveyance motor 106 provided in the conveyance unit 101 at a speed corresponding to the ejection frequency of an ejection operation performed by the liquid ejection head 102 to convey the print medium P in the +Y direction. As a result, an image corresponding to the image data received from the host device 108 is printed on the print medium P.

Further, the liquid feed unit 107 is a unit for supplying the liquid ejection head 102 with ink. Under the control by the CPU 103, the liquid feed unit 107 controls a pressure control unit, a switching mechanism, and the like provided in the inside, and controls an ink flow in an ink flow path including the liquid ejection head 102. The liquid feed unit 107 may function as a liquid supply unit that supplies the liquid ejection head 102 with ink or may have a function as a liquid circulation unit that circulates ink in an ink circulation path including the liquid ejection head 102. In a case where the liquid feed unit 107 has a function as a liquid circulation unit, the liquid feed unit 107 supplies the liquid ejection head 102 with ink and collects ink from the liquid ejection head 102.

[Description of the Liquid Ejection Head]

Figure 2A:
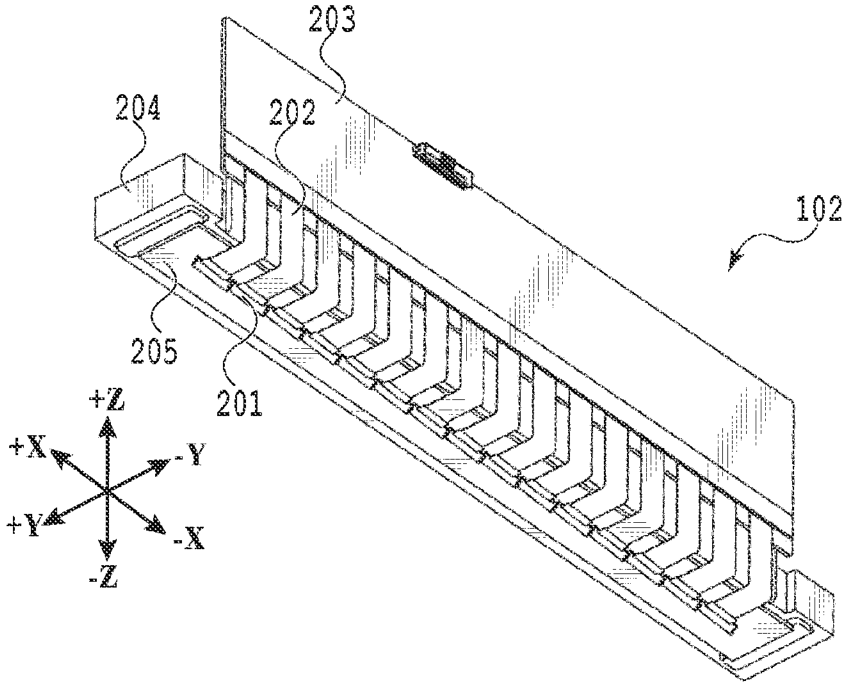
FIGS. 2A and 2B are perspective views of a liquid ejection head according to one embodiment.
Figure 2B:
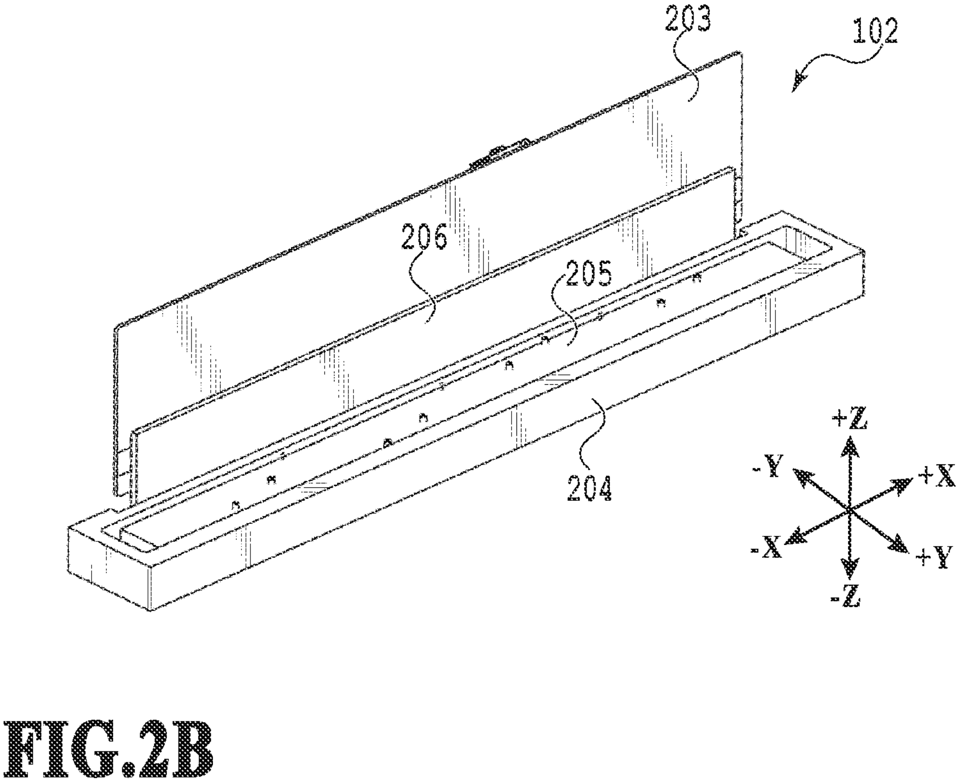

FIGS. 2A and 2B are perspective views of the liquid ejection head 102 according to the present embodiment. FIG. 2A is a perspective view of the liquid ejection head 102 according to the present embodiment as viewed from the bottom surface side. FIG. 2B is a perspective view of the liquid ejection head 102 according to the present embodiment as viewed from the upper surface side.

As shown in FIGS. 2A and 2B, the liquid ejection head 102 includes a print element substrate 201, a flexible wiring substrate 202, an electric wiring substrate 203, a liquid ejection unit support portion 204, a liquid ejection unit 205, and an electric wiring substrate support portion 206. The liquid ejection head 102 is a line-type liquid ejection head in which a plurality of print element substrates 201 capable of ejecting four colors of YMCK inks are arrayed linearly. In the present embodiment, 15 print element substrates 201 are arrayed linearly (arranged inline) in the X direction intersecting the Y direction.

Each print element substrate 201 is electrically connected to the electric wiring substrate 203 via the flexible wiring substrate 202. The liquid ejection unit support portion 204 supports the liquid ejection unit 205 including a channel unit 501 (described later) and the electric wiring substrate support portion 206 and ensures the rigidity of the liquid ejection head 102. The electric wiring substrate support portion 206 supports the electric wiring substrate 203. The electric wiring substrate support portion 206 is fixed to the liquid ejection unit support portion 204 by screwing. The liquid ejection unit support portion 204 has a role of correcting warpage or deformation of the liquid ejection unit 205 to ensure the relative position accuracy of a plurality of print element substrates 201. As a result, streaks or unevenness on the print medium P are suppressed. Thus, it is preferable that the liquid ejection unit support portion 204 have sufficient rigidity. For a material for the liquid ejection unit support portion 204, ceramic such as alumina or a metal material such as SUS and aluminum is suitable.

[Description of the Print Element Substrate]

Figure 3A:
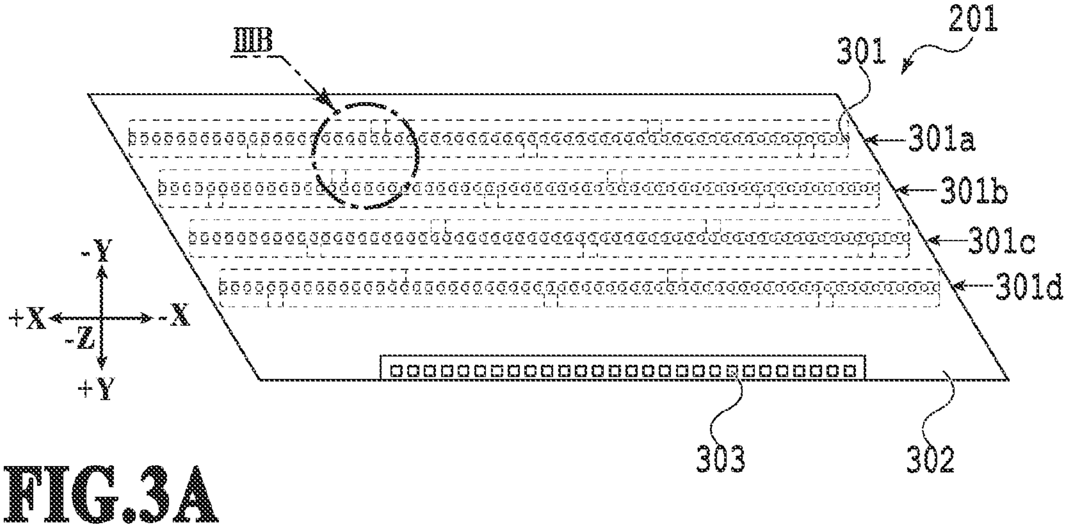
FIGS. 3A to 3C are schematic diagrams of a print element substrate according to one embodiment.
Figure 3B:
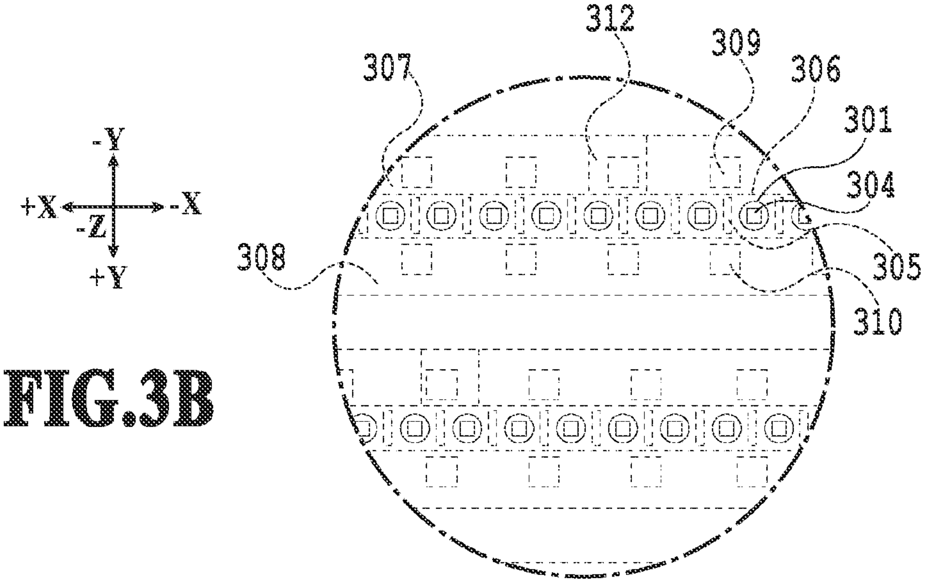
Figure 3C:
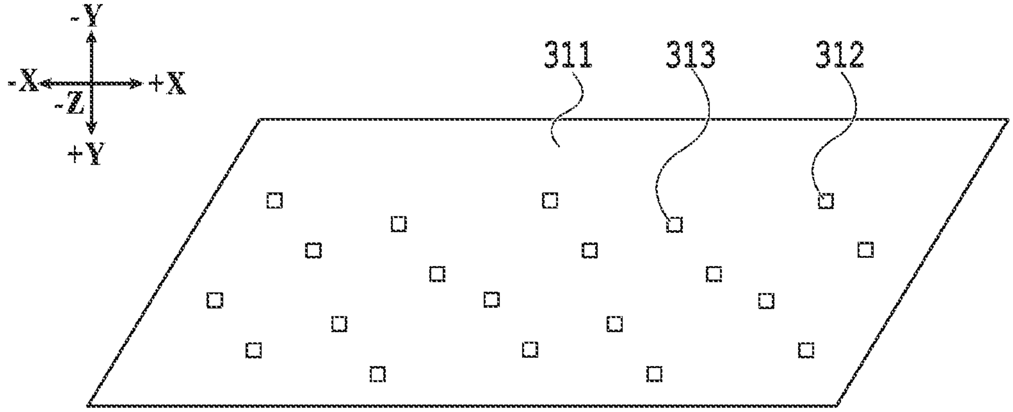

FIGS. 3A to 3C are schematic diagrams of the print element substrate 201 according to the present embodiment. FIG. 3A is a plan view of the surface on which ejection ports 301 are formed of the print element substrate 201 according to the present embodiment. FIG. 3B is an enlarged view of a portion denoted by IIIB in FIG. 3A. FIG. 3C is a plan view of a back surface opposite to the surface in FIG. 3A.

As shown in FIG. 3A, in the present embodiment, the substantially parallelogrammatic print element substrate 201 is used. Further, four rows of ejection port arrays corresponding to respective ink colors are formed in an ejection port forming member 302 arranged on the uppermost surface of the print element substrate 201 (see FIG. 4). In the present embodiment, yellow ink is ejected from the ejection ports 301 of a first ejection port array 301*a*. Similarly, magenta ink is ejected from the ejection ports 301 of a second ejection port array 301*b*. Similarly, cyan ink is ejected from the ejection ports 301 of a third ejection port array 301*c*. Similarly, black ink is ejected from the ejection ports 301 of a fourth ejection port array 301*d*.

Each ejection port array in which the ejection ports 301 are arrayed is arranged so as to be inclined at a certain angle with respect to the longitudinal direction (that is, the X direction) of the liquid ejection head 102. Further, in an ejection port array in a portion where the print element substrates 201 are adjacent to each other, at least one ejection port overlaps in the conveyance direction in which the print medium P is conveyed. A plurality of print element substrates 201 are arranged so that the first ejection port array 301*a* to the fourth ejection port array 301*d* are continuously aligned in the width direction (X direction) of the print medium P. Hereinafter, the direction in which the ejection ports 301 are arrayed will be referred to as an “ejection port array direction.” Further, a plurality of terminals 303 are arranged along the ejection port array direction in the print element substrate 201. Each terminal 303 is electrically connected to a liquid ejection apparatus 100 body via the flexible wiring substrate 202.

As shown in FIG. 3B, a print element 304, which is a heating element for foaming liquid with thermal energy, is arranged in a position corresponding to each ejection port 301. A partition 305 defines a pressure chamber 306 having the print element 304 therein. The print element 304 is electrically connected to the terminal 303 with electrical wiring (not shown) provided in the print element substrate 201. The print element 304 generates heat based on a pulse signal input from a control circuit of the liquid ejection apparatus 100 via the electric wiring substrate 203 and the flexible wiring substrate 202 and causes film boiling in liquid on the surface of the print element 304. The liquid is ejected from the ejection port 301 by the power of bubbling caused by the boiling.

As shown in the figure, a liquid supply path 307 extends on one side along each ejection port array and a liquid collection path 308 extends on the other side. The liquid supply path 307 and the liquid collection path 308 are channels formed in the print element substrate 201 and extending in the ejection port array direction. Each of the liquid supply path 307 and the liquid collection path 308 is coupled to the ejection port 301 via a first supply port 309 and a first collection port 310, which are channels.

As shown in FIG. 3C, a lid member 311 is stacked on the back surface opposite to the surface on which the ejection ports 301 are formed of the print element substrate 201. The lid member 311 is provided with a plurality of second supply ports 312 coupled to the liquid supply path 307 and a plurality of second collection ports 313 coupled to the liquid collection path 308. In the present embodiment, the lid member 311 is provided with three second supply ports 312 for one liquid supply path 307 which is a common channel extending along the longitudinal direction of the print element substrate 201. Similarly, the lid member 311 is provided with two second collection ports 313 for one liquid collection path 308 which is a supply collection path extending along the longitudinal direction.

Figure 4:
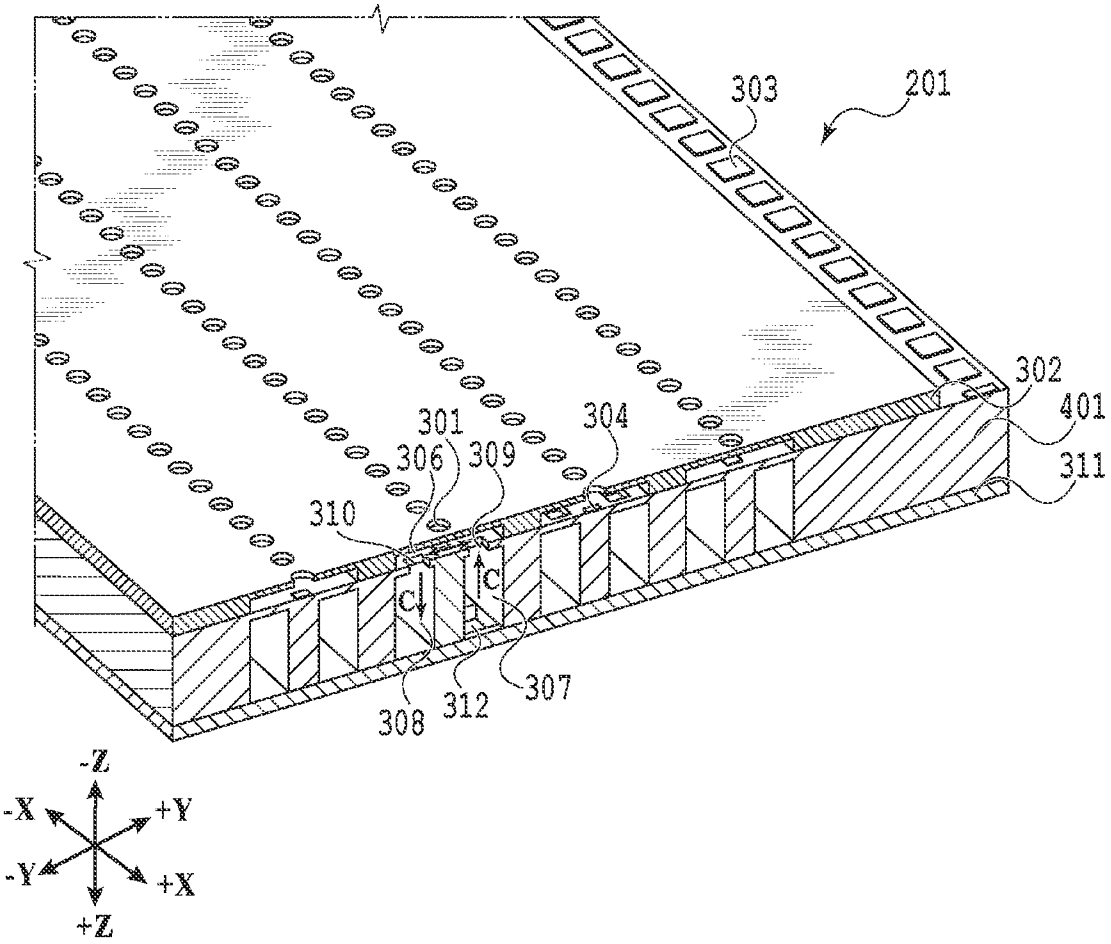
FIG. 4 is a perspective view showing a cross section of the print element substrate according to one embodiment.

FIG. 4 is a perspective view showing a cross section of the print element substrate 201 according to the present embodiment.

The print element substrate 201 is formed by the ejection port forming member 302 being stacked on and bonded to one side of a substrate 401 on which a channel is formed and the lid member 311 being stacked on and bonded to the other side. The substrate 401 is made of silicon, and the ejection port forming member 302 is made of photosensitive resin. The lid member 311 has a function as a lid that forms a portion of the walls of the liquid supply path 307 and the liquid collection path 308 formed in the substrate 401. In the substrate 401, the print element 304 is formed on a surface on an ejection port forming member 302 side, and a groove forming the liquid supply path 307 and the liquid collection path 308 extending along the ejection port array is formed on a surface on a lid member 311 side.

Each of the liquid supply path 307 and the liquid collection path 308 formed by the lid member 311 and the substrate 401 is coupled to a channel in the channel unit 501, which will be described later, and there is a differential pressure between the liquid supply path 307 and the liquid collection path 308. Due to this differential pressure, while liquid is ejected from the ejection port 301 to perform printing, liquid in the liquid supply path 307 provided in the substrate 401 flows into the liquid collection path 308 in an ejection port through which no ejection is performed (see arrow C in FIG. 4). This flow makes it possible to collect thickened ink, an air bubble, foreign matter, and the like generated by evaporation from the ejection port 301 to the liquid collection path 308 in the ejection port 301 where an ejection operation is suspended and the pressure chamber 306. Further, it is also possible to suppress an increase in the viscosity of ink in the ejection port 301 and the pressure chamber 306. The liquid collected into the liquid collection channel 308 is collected into a collection channel in the channel unit 501 through the second collection port 313 of the lid member 311 and collected into a collection path of the liquid ejection apparatus 100. That is, the liquid supplied from the liquid ejection apparatus 100 body to the liquid ejection head 102 flows again and is supplied and collected.

[Description of the Liquid Ejection Unit]

Figure 5:
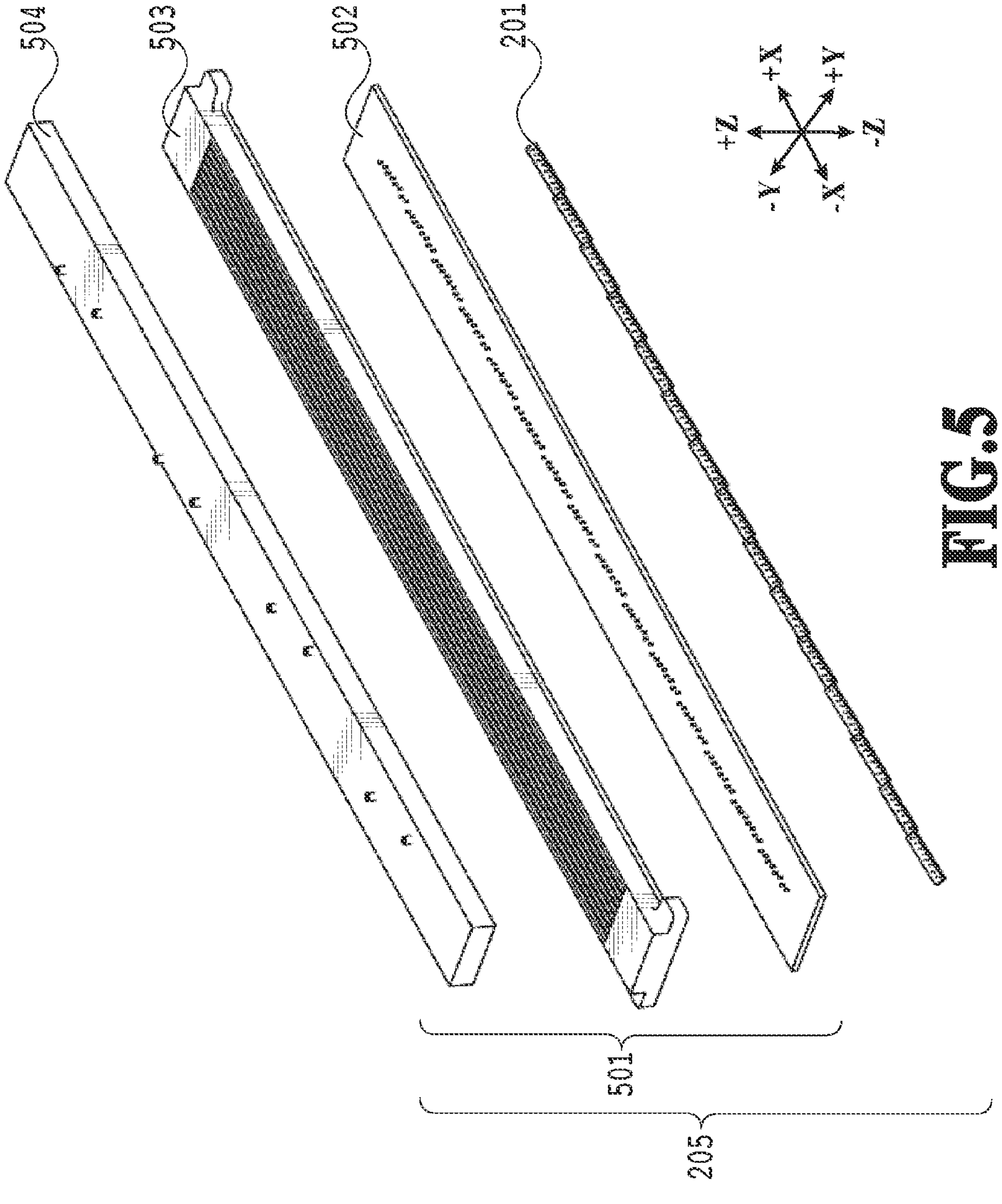
FIG. 5 is an exploded perspective view of a liquid ejection unit according to one embodiment.

FIG. 5 is an exploded perspective view of the liquid ejection unit 205 according to the present embodiment.

As shown in FIG. 5, the liquid ejection unit 205 includes a plurality of print element substrates 201 and the channel unit 501. The channel unit 501 is formed by stacking a first pitch conversion member 502, a first channel member 503, and a second channel member 504. The channel unit 501 is a member that distributes the liquid supplied to the liquid ejection unit 205 of the liquid ejection apparatus 100 to each print element substrate 201. The channel unit 501 is also a member that finally returns the liquid circulated from the print element substrate 201 to the inside of the body of the liquid ejection apparatus 100. The channel unit 501 is fixed to the liquid ejection unit support portion 204 by screwing. This suppresses deformation such as warpage in the channel unit 501.

Figure 6:
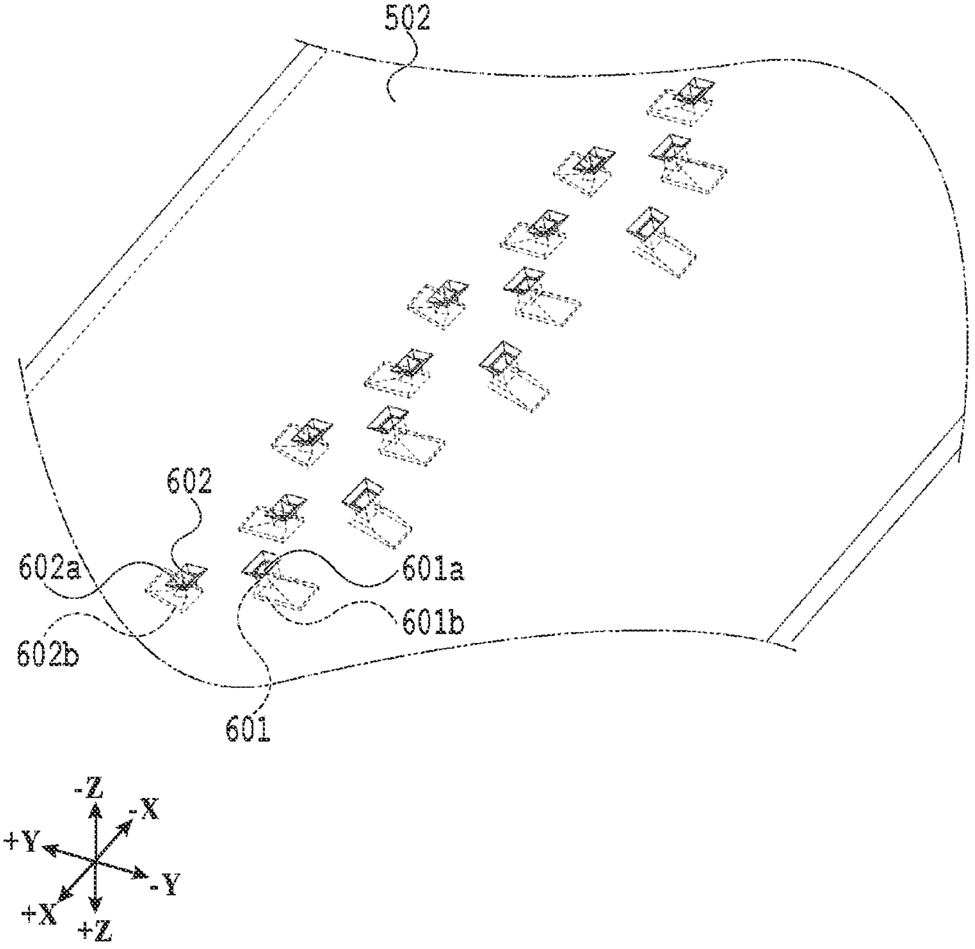
FIG. 6 is a perspective view of a first pitch conversion member according to one embodiment.

FIG. 6 is a perspective view of the first pitch conversion member 502 according to the present embodiment.

As shown in FIG. 6, a plurality of pitch conversion holes are formed in the first pitch conversion member 502. A plurality of pitch conversion holes include a pitch conversion hole for supplying the print element substrate 201 with ink and a pitch conversion hole for collecting ink from the print element substrate 201.

Herein, one of a plurality of pitch conversion holes will be referred to as a first pitch conversion hole 601, and a pitch conversion hole formed in a position closest to the first pitch conversion hole 601 will be referred to as a second pitch conversion hole 602. An opening formed in a bonding surface between the first pitch conversion member 502 and the print element substrate 201 in the first pitch conversion hole 601 will be referred to as a first opening 601*a*. On the other hand, an opening formed in a bonding surface between the first pitch conversion member 502 and the first channel member 503 in the first pitch conversion hole 601 will be referred to as a second opening 601*b*.

Additionally, an opening formed in a bonding surface between the first pitch conversion member 502 and the print element substrate 201 in the second pitch conversion hole 602 will be referred to as a third opening 602*a*. On the other hand, an opening formed in a bonding surface between the first pitch conversion member 502 and the first channel member 503 in the second pitch conversion hole 602 will be referred to as a fourth opening 602*b*. Hereinafter, in a case where there is no specific need to distinguish the first pitch conversion hole 601 from the second pitch conversion hole 602, the first pitch conversion hole 601 and the second pitch conversion hole 602 will be simply referred to as “the pitch conversion hole.” Similarly, in a case where there is no specific need to distinguish among the first opening 601*a* to the fourth opening 602*b*, the first opening 601*a* to the fourth opening 602*b* will be simply referred to as “the opening in the pitch conversion hole.”

The pitch conversion hole is a through hole penetrating the first pitch conversion member 502 in the direction of gravity with the first pitch conversion member 502 arranged between the first channel member 503 and the print element substrate 201. The first pitch conversion hole 601 and the second pitch conversion hole 602 are formed in the first pitch conversion member 502. With the first pitch conversion member 502 arranged between the print element substrate 201 and the first channel member 503, the first pitch conversion hole 601 converts the array pitch of each channel in the first channel member 503 into the array pitch of each channel formed in the print element substrate 201. Similarly, the second pitch conversion hole 602 also converts the array pitch of each channel in the first channel member 503 into the array pitch of each channel formed in the print element substrate 201.

As shown in the figure, the size of an opening formed in the bonding surface with the print element substrate 201 is different from the size of an opening formed in the bonding surface with the first channel member 503. For example, comparison between the second opening 601*b* formed in the bonding surface with the first channel member 503 and the first opening 601*a* formed in the bonding surface with the print element substrate 201 shows that the second opening 601*b* is larger than the first opening 601*a*.

Such a configuration makes it possible to convert an array pitch in the Y direction in a plurality of channels formed in the channel unit 501 into an array pitch in the Y direction in a plurality of channels formed in the print element substrate 201 smaller than the channel unit 501.

Figures 7A, 7B, 7C, 7D, 7E, 7F:
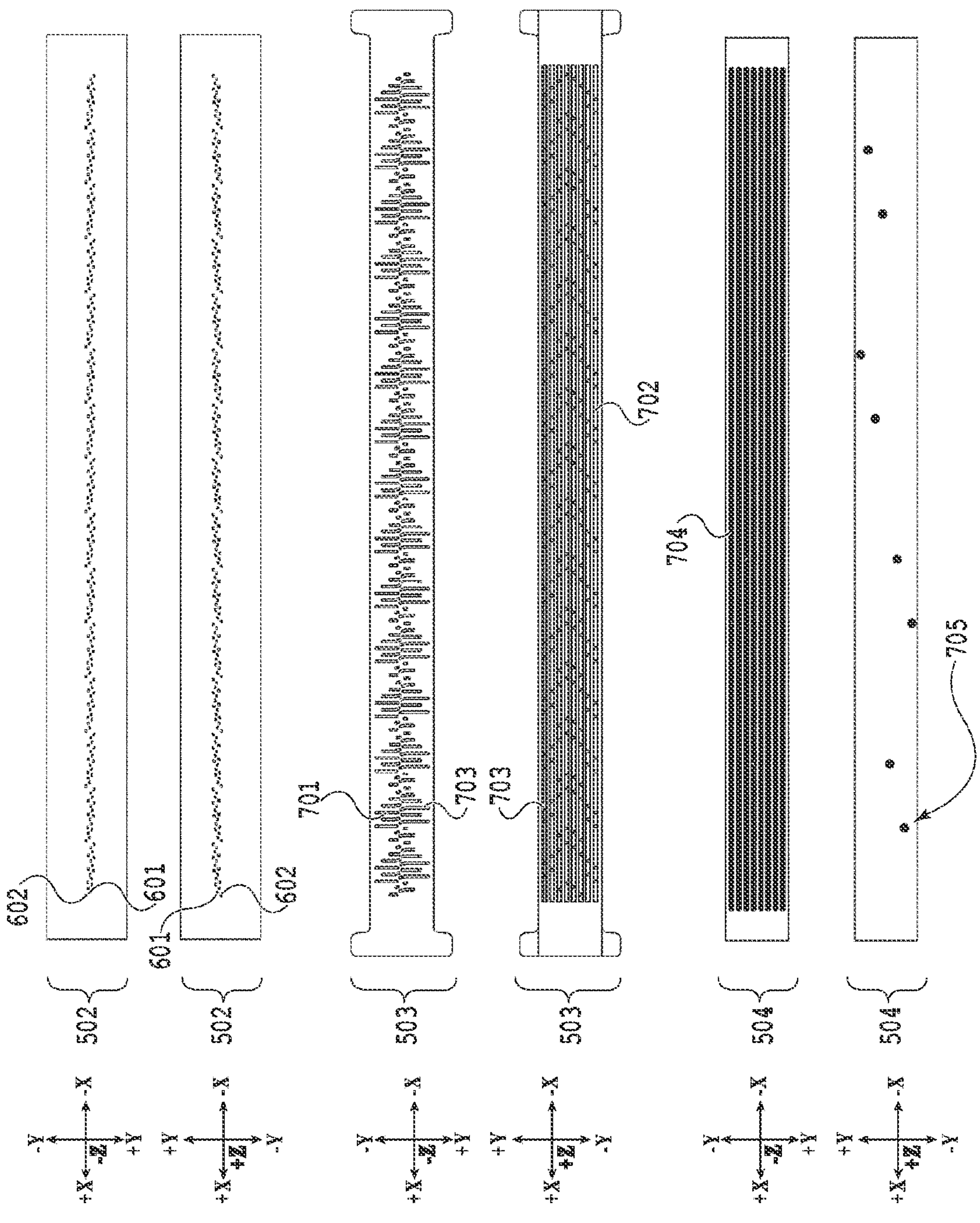
FIGS. 7A to 7F are diagrams showing the upper surface and the bottom surface of each member included in a channel unit according to one embodiment.

FIGS. 7A to 7F are diagrams showing the upper surface and the bottom surface of each member included in the channel unit 501 according to the present embodiment. FIG. 7A is a diagram of the bottom surface of the first pitch conversion member 502. This surface is bonded to the lid member 311 of the print element substrate 201. FIG. 7B is a diagram of the upper surface of the first pitch conversion member 502.

As shown in FIGS. 7A and 7B, a plurality of first pitch conversion holes 601 and a plurality of second pitch conversion holes 602 are formed in the first pitch conversion member 502.

FIG. 7C is a diagram of the bottom surface of the first channel member 503. As shown in FIG. 7C, in the bottom surface of the first channel member 503, individual channel grooves 701, which are a plurality of channels extending in the Y direction, are formed. The bottom surface of the first channel member 503 and the upper surface of the first pitch conversion member 502 are bonded so as to face each other. As a result, in the case of supplying the print element substrate 201 with liquid, the liquid can pass from each individual channel groove 701 for supplying liquid through the pitch conversion hole to the print element substrate 201. In contrast, in the case of collecting liquid from the print element substrate 201, the liquid can pass from the print element substrate 201 through the pitch conversion hole to the individual channel groove 701 for collecting liquid.

FIG. 7D is a diagram of the upper surface of the first channel member 503. As shown in FIG. 7D, eight first common channel grooves 702 extending in the X direction are formed in the upper surface of the first channel member 503. A first coupling port 703 is formed between the individual channel groove 701 and the first common channel groove 702. As a result, in the case of ejecting liquid, the liquid can pass from the first common channel groove 702 formed in the upper surface of the first channel member 503 through the first coupling port 703 to the individual channel groove 701 formed in the bottom surface of the first channel member 503. In contrast, in the case of collecting liquid, the liquid can pass from the individual channel groove 701 through the first coupling port 703 to the first common channel groove 702. As described above, in the first channel member 503, the individual channel groove 701 is used to convert the array pitch of the first common channel groove 702 formed in the upper surface so as to correspond to a plurality of channels formed in the first pitch conversion member 502.

FIG. 7E is a diagram of the bottom surface of the second channel member 504. As shown in FIG. 7E, eight second common channel grooves 704 extending in the X direction are formed in positions corresponding to the first common channel grooves 702 in the bottom surface of the second channel member 504. The bottom surface of the second channel member 504 and the upper surface of the first channel member 503 are bonded so as to face each other. As a result, four common supply channels 801 (see FIGS. 8A and 8B) and four common collection channels 802 (see FIGS. 8A and 8B) extending in the longitudinal direction of the channel unit 501 (that is, the X direction) are formed.

FIG. 7F is a diagram of the upper surface of the second channel member 504. As shown in FIG. 7F, a plurality of second coupling ports 705 coupled to the buffer tank (not shown) provided in the liquid ejection apparatus 100 body are formed in the upper surface of the second channel member 504. As a result, in the case of ejecting liquid, the liquid can pass from the buffer tank through the second coupling port 705 for supplying liquid to the second common channel groove 704 formed in the bottom surface of the second channel member 504. In contrast, in the case of collecting liquid, the liquid can pass from the second common channel groove 704 through the second coupling port 705 for supplying liquid to the buffer tank.

The first pitch conversion member 502, the first channel member 503, and the second channel member 504 preferably include a material having corrosion resistance to liquid and a low linear expansion coefficient. Examples of a suitably-usable material include a metal material, ceramic (e.g., alumina), and a resin material, liquid crystal polymer (LCP) and polyphenylene sulfide (PPS) in particular. There is further included a composite material or the like to which an inorganic filler such as a silica fine particle or fiber is added using polysulfone (PSF) or modified polyphenylene ether (PPE) as a base material.

As a method of bonding the channel unit 501, the first pitch conversion member 502, the first channel member 503, and the second channel member 504 may be stacked and adhered to each other. In the case of selecting a resin composite resin material as a material for the channel unit 501, the first pitch conversion member 502, the first channel member 503, and the second channel member 504 may be welded to each other.

A 3D printer may be used to form the channel unit 501. For example, the first pitch conversion member 502, the first channel member 503, and the second channel member 504 may be integrally formed with the 3D printer without using any adhesive.

[Description of the Pitch Conversion Member]

The flatness of each member forming the channel unit 501 is preferably as high as possible. For example, the flatness of the bonding surface bonded to the print element substrate 201 in the first pitch conversion member 502 is preferably 10 μm or less.

Further, the flatness of the bonding surface bonded to the first channel member 503 in the first pitch conversion member 502 is preferably 10 μm or less. Assuming that the print element substrate 201 and the first channel member 503 are adhered with an adhesive without interposing the first pitch conversion member 502, in the case of manufacturing the first channel member 503, there is a case where the surface of the first channel member 503 has sink marks (that is, fine unevenness). In a case where, for example, the first channel member 503 is a resin molded product, the surface of the first channel member 503 may have unevenness of at least about 0.05 mm. The surface of the first channel member 503 in this case is also a bonding surface with the print element substrate 201. Thus, in a case where the first pitch conversion member 502 is not interposed, the flatness of the bonding surface of the first channel member 503 is decreased, and there is a possibility that defective bonding will occur between the first channel member 503 and the print element substrate 201.

Further, in the case of adhering the print element substrate 201 and the first channel member 503 with an adhesive, it is necessary to form an adhesive layer at least which can fill the sink marks. However, in general, in the case of applying an adhesive, the width (that is, a length in a plane direction) of a portion to which the adhesive is applied needs to be greater than the thickness (that is, the height) of the adhesive in order to suppress dripping and the like. That is, in order to fill unevenness of about 0.05 mm, it is required that an adhesive be applied to a width region greater than 0.05 mm. On the other hand, in the lid member 311 of the print element substrate 201, a plurality of second supply ports 312 and second collection ports 313 are formed at a smaller pitch than a pitch at which a plurality of individual channel grooves 701 formed in the first channel member 503 are arrayed.

Thus, in the case of applying an adhesive to the lid member 311 widely, a possibility arises that the overflow adhesive may enter and clog the second supply port 312 or the second collection port 313. Assuming that the adhesive clogs the second supply port 312 or the second collection port 313, it is difficult to stably circulate liquid. That is, in a case where the print element substrate 201 and the first channel member 503 are adhered without interposing the first pitch conversion member 502, it can be said that there is a possibility that the quality of an output image may be reduced.

Additionally, in the case of reducing a length in a lateral direction (that is, the Y direction) in order to miniaturize the print element substrate 201, as compared to a case where the miniaturization is not performed, a distance from the second supply port 312 and the second collection port 313 to the individual channel groove 701 of the first channel member 503 is also increased.

Further, in a case where the print element substrate 201 is miniaturized, the size of the second supply port 312 or the second collection port 313 becomes even smaller and intervals at which a plurality of second supply ports 312 or a plurality of second collection ports 313 are arranged become even shorter. That is, in a case where the print element substrate 201 is miniaturized, the area of a portion to which the adhesive can be applied in the first channel member 503 is further reduced. Accordingly, even in a case where the print element substrate 201 is miniaturized, it is necessary to secure the area of a portion to which an adhesive can be applied. Thus, in the present embodiment, the first pitch conversion member 502 is provided between the print element substrate 201 and the first channel member 503.

Figure 8A:
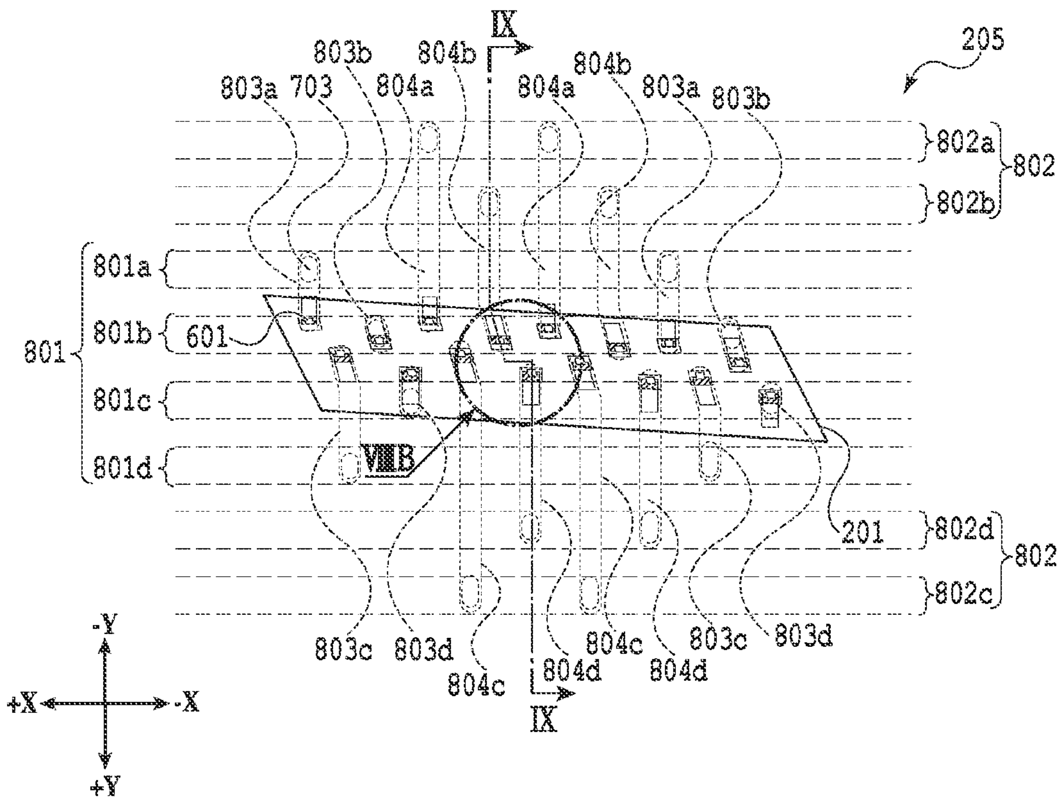
FIGS. 8A and 8B are perspective views of the liquid ejection unit according to one embodiment.
Figure 8B:
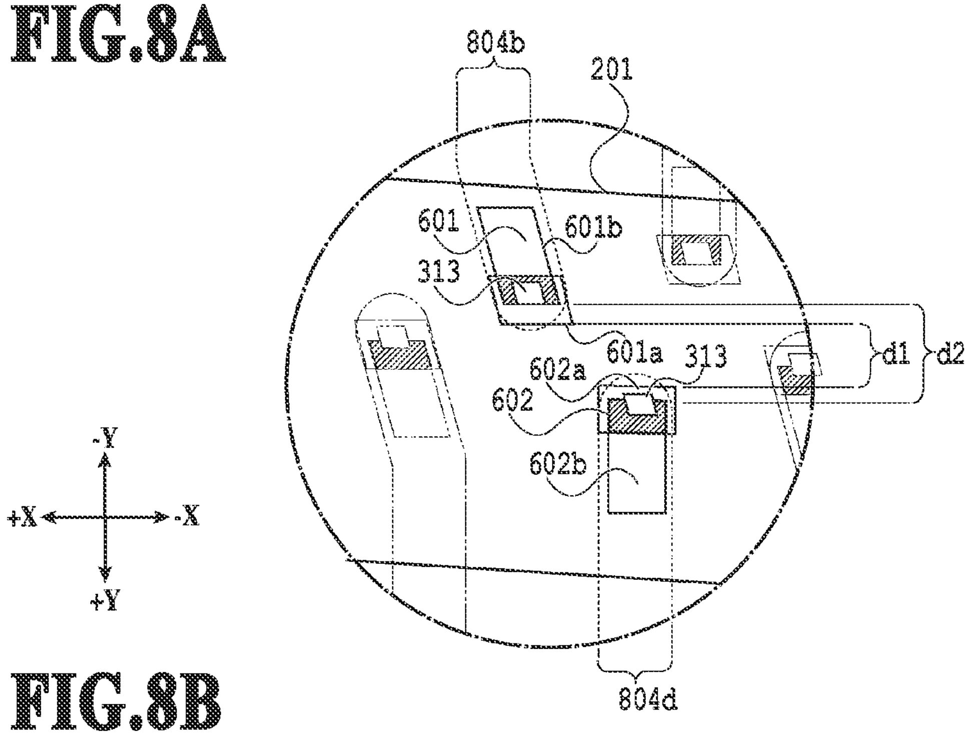

FIGS. 8A and 8B are perspective views of the liquid ejection unit 205 according to the present embodiment.

FIG. 8A is a perspective view of the first pitch conversion member 502, the first channel member 503, and the second channel member 504 in the case of observing the liquid ejection unit 205 according to the present embodiment from the −Z direction (ejection port surface side).

The print element substrate 201, the first pitch conversion member 502, the first channel member 503, and the second channel member 504 are arranged in this order from the front to the back in the figure. In the present embodiment, the bottom surface of the second channel member 504 and the upper surface of the first channel member 503 are bonded so as to face each other, so that the four common supply channels 801 and four common collection channels 802 are formed. A first common supply channel 801*a* of the four common supply channels 801 is used to supply yellow ink. A second common supply channel 801*b* is used to supply magenta ink. A third common supply channel 801*c* is used to supply black ink. A fourth common supply channel 801*d* is used to supply cyan ink.

On the other hand, a first common collection channel 802*a* of the four common collection channels 802 is used to collect yellow ink. A second common collection channel 802*b* is used to collect magenta ink. A third common collection channel 802*c* is used to collect cyan ink. A fourth common collection channel 802*d* is used to collect black ink.

Further, the individual channel grooves 701 (see FIG. 7C) formed in the bottom surface of the first channel member 503 are classified into a first individual supply channel 803*a* to a fourth individual supply channel 803*d* and a first individual collection channel 804*a* to a fourth individual collection channel 804*d*. The first individual supply channel 803*a* of the four individual supply channels is used to supply yellow ink. The second individual supply channel 803*b* is used to supply magenta ink. The third individual supply channel 803*c* is used to supply cyan ink. The fourth individual supply channel 803*d* is used to supply black ink.

Further, the first individual collection channel 804*a* of the four individual collection channels is used to collect yellow ink. The second individual collection channel 804*b* is used to collect magenta ink. The third individual collection channel 804*c* is used to collect cyan ink. The fourth individual collection channel 804*d* is used to collect black ink. As described above, in the second coupling port 705, the common channel grooves, the individual channels, and the pitch conversion holes, the supply channel and the collection channel are formed independently for each ink color (see FIGS. 7A to 7E).

FIG. 8B is an enlarged view of a region VIIIB shown in FIG. 8A.

As shown in FIG. 8B, in the case of viewing the pitch conversion holes from the −Z direction, each of the pitch conversion holes has a first opening coupled to the print element substrate 201 and a second opening coupled to the first channel member 503. The first opening and the second opening have regions that overlap each other as viewed in a direction in which the pitch conversion hole penetrates the first pitch conversion member 502. In the illustrated example, as viewed in a direction in which the first pitch conversion hole 601 penetrates the first pitch conversion member 502, the first opening 601*a* and the second opening 601*b* of the first pitch conversion hole 601 overlap each other. Similarly, as viewed in a direction in which the second pitch conversion hole 602 penetrates the first pitch conversion member 502, the third opening 602*a* and the fourth opening 602*b* of the second pitch conversion hole 602 overlap each other.

In FIG. 8B, a region where the first opening 601*a* and the second opening 601*b* overlap each other and a region where the third opening 602*a* and the fourth opening 602*b* overlap each other are hatched. For example, the area of the region where the first opening 601*a* and the second opening 601*b* overlap each other is preferably 100 $\mu m^2$ or more. Similarly, the area of the region where the third opening 602*a* and the fourth opening 602*b* overlap each other is also preferably 100 $\mu m^2$ or more. Such a configuration makes it possible, even in a case where an air bubble is generated in the print element substrate 201, to secure a sufficient region for releasing the air bubble.

Among a plurality of pitch conversion holes, in two pitch conversion holes that are closest to each other in the X direction intersecting the Y direction, a distance between the first openings in the Y direction is smaller than a distance between the second openings. In the illustrated example, among a plurality of pitch conversion holes, the first pitch conversion hole 601 and the second pitch conversion hole 602 are closest to each other in the X direction orthogonal to the Y direction. Further, in the Y direction, a distance from the first opening 601*a* to the third opening 602*a* is smaller than a distance from the second opening 601*b* to the fourth opening 602*b*.

In FIG. 8B, the distance in the Y direction from the first opening 601*a* to the third opening 602*a* is denoted as "d1" and the distance in the Y direction from the second opening 601*b* to the fourth opening 602*b* is denoted as "d2." In the present embodiment, the following formula holds for each distance between the openings.

$$d1<d2 \quad \text{(Formula 1)}$$

For example, the fourth opening 602*b* is formed in a position closest to the second opening 601*b* in the Y direction. In this case, the distance in the Y direction from the second opening 601*b* to the fourth opening 602*b* is preferably greater than the distance from the first opening 601*a* to the third opening 602*a* formed in a position closest to the first opening 601*a* by 10 μm or more.

Such a configuration makes it possible to convert the array pitch of a plurality of liquid supply channels 307 (see FIGS. 3A to 3C) arrayed in the Y direction into the array pitch of a plurality of common supply channels 801 arrayed in the Y direction. Similarly, the array pitch of a plurality of liquid collection channels 308 (see FIGS. 3A to 3C) arrayed in the Y direction can be converted into the array pitch of a plurality of common collection channels 802 arrayed in the Y direction.

Figure 9:
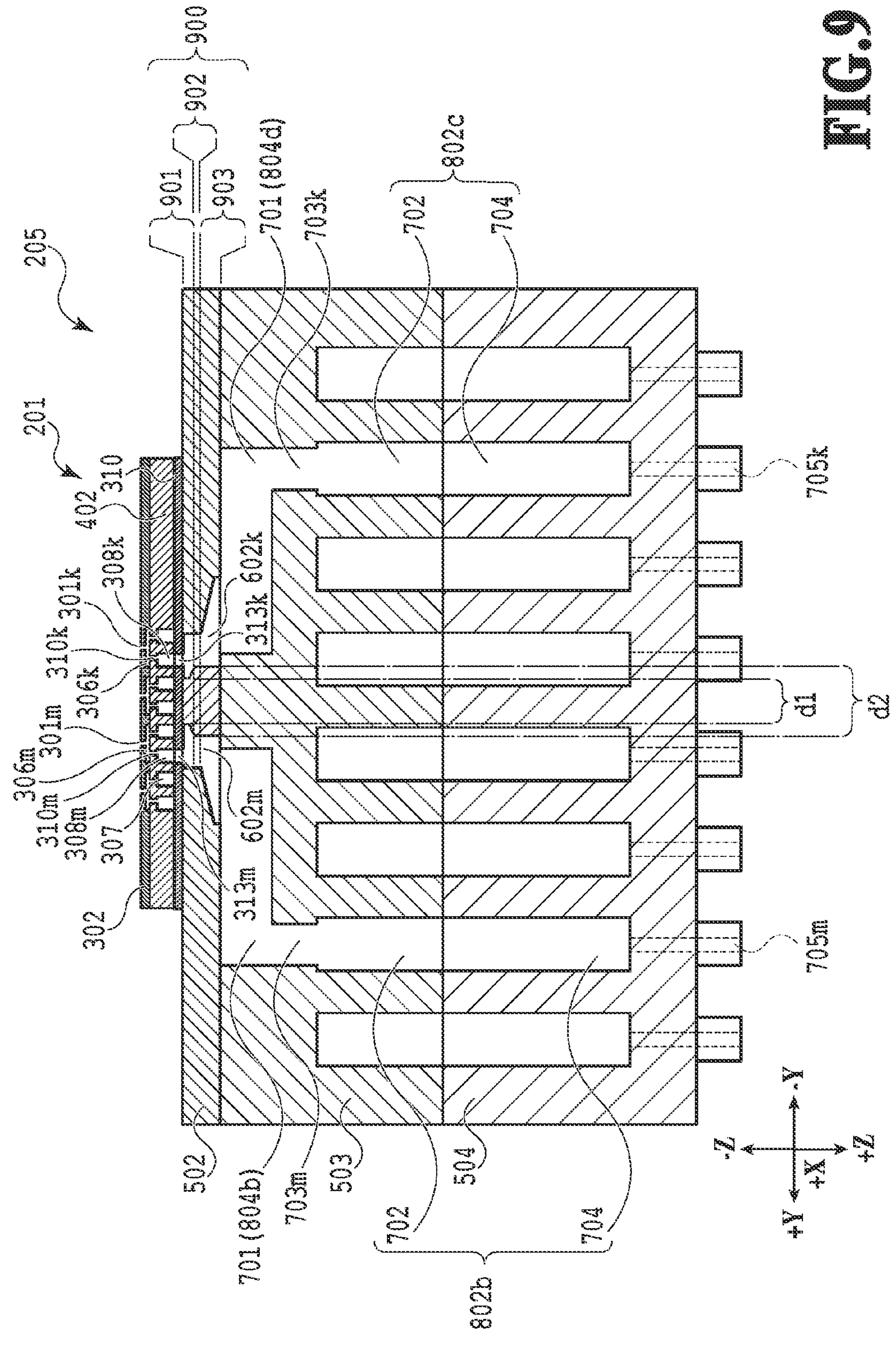
FIG. 9 is a sectional view taken along IX-IX in FIG. 8A.

FIG. 9 is a sectional view taken along IX-IX in FIG. 8A.

As shown in FIG. 9, the first pitch conversion member 502 is arranged between the print element substrate 201 and the first channel member 503. In the first pitch conversion member 502, a plurality of pitch conversion holes are formed. Each of the pitch conversion holes is formed in a direction in which the first pitch conversion member 502 is penetrated (Z direction) with the first pitch conversion member 502 arranged between the print element substrate 201 and the channel member. The first pitch conversion member 502 converts the array pitch in the Y direction of each channel formed in the channel member into the array pitch in the Y direction of each channel formed in the print element substrate 201. The first pitch conversion member 502 also couples a plurality of channels formed in the print element substrate 201 to a plurality of channels formed in the channel member so that the above array pitch conversion can be made.

In order to facilitate understanding of the liquid ejection unit 205 in the present embodiment, the symbol "m" is assigned to a channel through which magenta ink passes and the symbol "k" is assigned to a channel through which black ink passes. For example, ink that has not been ejected from an ejection port 301*m* for ejecting magenta ink in the print element substrate 201 flows through a pressure chamber 306*m*, a first collection port 310*m*, a liquid collection path 308*m*, and a second collection port 313*m* in this order into the first pitch conversion member 502.

Subsequently, in the first pitch conversion member 502, the ink flows through a pitch conversion hole 602*m*, coupled to the second collection port 313*m* of the print element substrate 201, of the first pitch conversion member 502 into the first channel member 503.

Then, in the first channel member 503 and the second channel member 504, the ink flows into the second individual collection channel 804*b* coupled to the pitch conversion hole 602*m* of the first pitch conversion member 502. Further, after entering the second individual collection channel 804*b*, the ink flows through a coupling port 703*m*, the second common collection channel 802*b* including the first common channel groove 702 and the second common channel groove 704, and a coupling port 705*m* in this order, and returns to the liquid ejection apparatus 100 body.

On the other hand, the ink that has not been ejected from an ejection port 301*k* for ejecting black ink flows through a pressure chamber 306*k*, a first collection port 310*k*, a liquid collection path 308*k*, and a second collection port 313*k* in this order into the first pitch conversion member 502.

Subsequently, in the first pitch conversion member 502, the ink flows through a pitch conversion hole 602*k*, coupled to the second collection port 313*k* of the print element substrate 201, of the first pitch conversion member 502 into the first channel member 503.

Then, in the first channel member 503 and the second channel member 504, the ink flows into the fourth individual collection channel 804*d* coupled to the pitch conversion hole 602*k* of the first pitch conversion member 502. Further, after entering the fourth individual collection channel 804*d*, the ink flows through a coupling port 703*k*, the third common collection channel 802*c* including the first common channel groove 702 and the second common channel groove 704, and a coupling port 705*k* in this order, and returns to the liquid ejection apparatus 100 body.

Such a configuration makes it possible to convert the array pitch in the Y direction of each common collection channel 802 formed in the channel member into the array pitch in the Y direction of each liquid collection path 308 formed in the print element substrate 201. Similarly, the array pitch in the Y direction of each common supply channel 801 (see FIGS. 8A and 8B) formed in the channel member can be converted into the array pitch in the Y direction of each liquid supply path 307 (see FIG. 4) formed in the print element substrate 201.

Further, the pitch conversion hole has a region 900 extending in the direction of gravity with the first pitch conversion member 502 arranged between the print element substrate 201 and the first channel member 503. In the region 900, a first region 901, a second region 902, and a third region 903 having different diameters are formed continuously. As shown in the figure, the first region 901 has a diameter reducing from an opening formed in a surface contacting the print element substrate 201 toward the direction of anti-gravity (+Z direction) with the first pitch conversion member 502 arranged between the print element substrate 201 and the first channel member 503. The second region 902 extends in the direction of anti-gravity while maintaining the size of the diameter. The third region 903 has a diameter increasing from the second region 902 toward the direction of anti-gravity (+Z direction) such that the size of the opening formed in the surface contacting the first channel member 503 is larger than that of the opening formed in the surface contacting the print element substrate 201.

Incidentally, in a case where the print element substrate 201 is miniaturized, the second supply port 312 and the second collection port 313 are also miniaturized. In a case where an air bubble is generated in the print element substrate 201 due to residual gas or the like in liquid, the effect of the air bubble can be grown. Specifically, in a case where the miniaturized second supply port 312 and second collection port 313 are clogged with the air bubble, there is a possibility that image quality will be significantly decreased. Thus, it is important to quickly release the air bubble from the print element substrate 201 to the first channel member 503 in the pitch conversion hole.

Thus, in the present embodiment, with the first pitch conversion member 502 and the print element substrate 201 bonded to each other, the pitch conversion hole is formed so as to overlap at least a portion of the second supply port 312 or the second collection port 313 of the print element substrate 201. For example, with the first pitch conversion member 502 and the print element substrate 201 bonded to each other, the pitch conversion hole 602*m* is formed so as to overlap the entire second collection port 313*m*.

Here, in a state where the first pitch conversion member 502 and the print element substrate 201 are bonded, the size of the second region 902 in a height direction (that is, the Z direction) in the pitch conversion hole is preferably smaller than the sizes of the first region 901 and the third region 903. This is because the second region 902 is a region with the smallest diameter in the pitch conversion hole and has the largest pressure loss of liquid. As the pressure loss increases, it becomes more difficult to stably supply or collect liquid to or from the print element substrate 201. The size in the height direction of the second region 902 is preferably 0.5 mm or less.

It is preferable that the inner peripheral surface of the pitch conversion hole have rounded corners with a rounded shape or the like. This is because in a case where there are a lot of corners in the inner peripheral surface of the pitch conversion hole, an air bubble may be captured by the pinning effect, which may cause a decrease in print quality. Such a configuration allows the pitch conversion hole to quickly release the air bubble coming out of the second supply port 312 or the second collection port 313 into the individual channel groove 701.

Bonding the print element substrate 201 and the first channel member 503 via the first pitch conversion member 502 can increase a bonding area as compared with the case of directly adhering the print element substrate 201 and the first channel member 503. Comparison between the area of a portion where the individual channel grooves 701 are formed in the first channel member 503 and the area of a portion where the pitch conversion holes are formed in the first pitch conversion member 502 shows that the area of the portion where the individual channel grooves are formed is larger. That is, since the area of the portion where the pitch conversion holes are formed is smaller than the area of the portion where the individual channel grooves 701 are formed, it is possible to secure a bonding area with the print element substrate 201 (see FIGS. 7A to 7F).

Therefore, the technique according to the present disclosure can provide a liquid ejection head that is more reliable than conventional ones.

Second Embodiment

A second embodiment according to the technique of the present disclosure will be described below with reference to the drawings. In the following description, the same reference numeral is given to a feature identical or corresponding to that in the first embodiment, the description thereof is omitted, and a different respect is mainly described. An object of the present embodiment is to provide a liquid ejection head capable of reducing the possibility of defective printing even in a case where the number of ejection port arrays is increased.

Figure 10A:
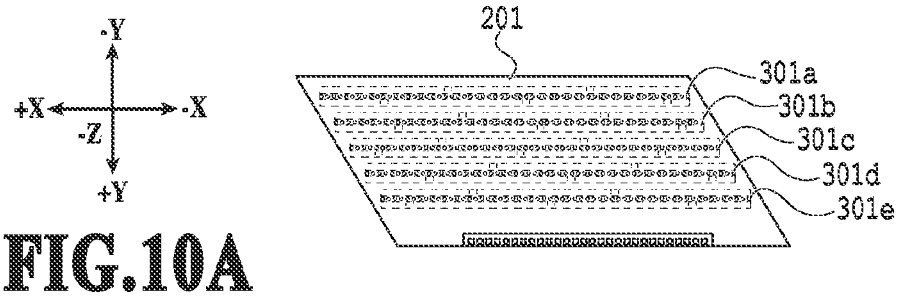
FIGS. 10A to 10C are schematic diagrams of the print element substrate according to one embodiment.
Figure 10B:
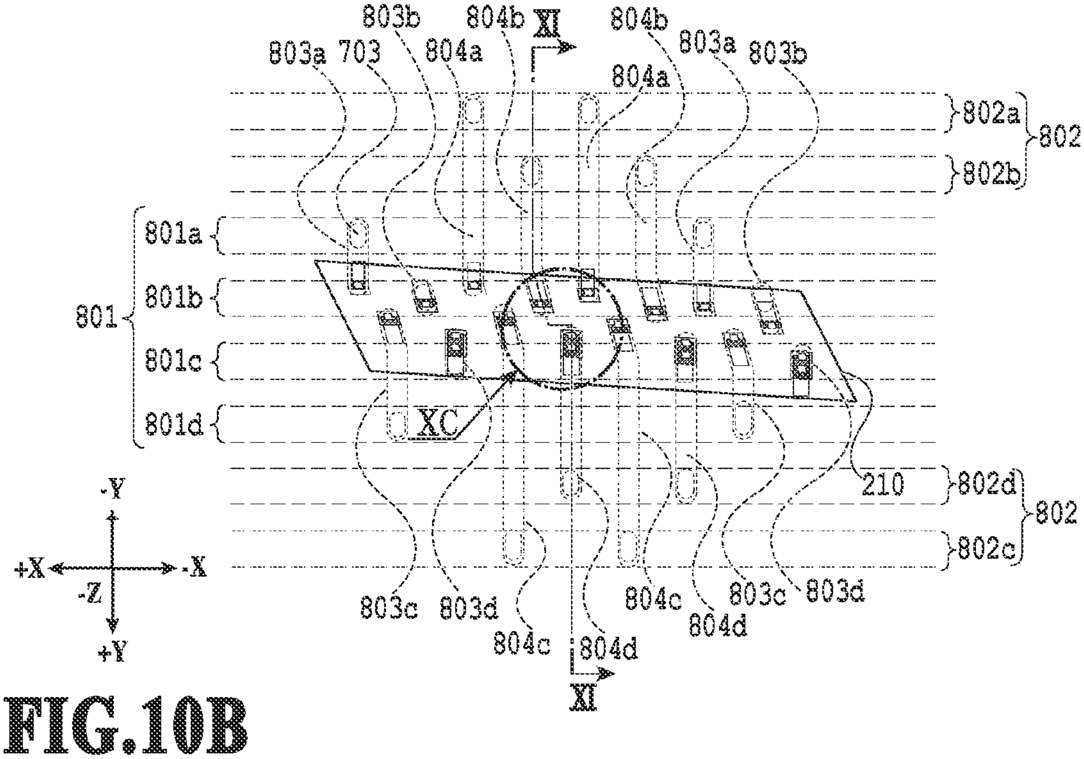
Figure 10C:
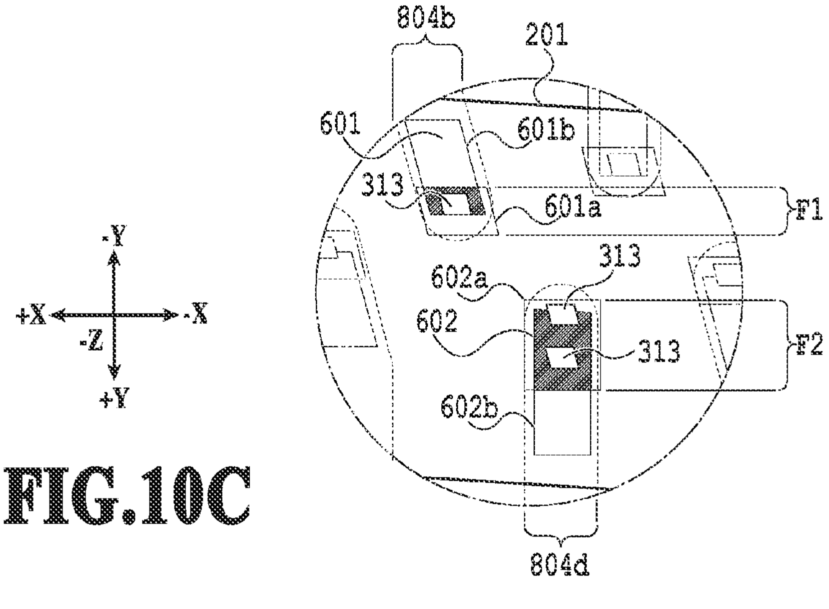

FIGS. 10A to 10C are schematic diagrams of the print element substrate 201 according to the present embodiment.

FIG. 10A is a plan view of the surface on which the ejection port 301 is formed of the print element substrate 201 according to the present embodiment. As shown in FIG. 10A, the print element substrate 201 has a fifth ejection port array 301*e*. It is preferable that more ejection port arrays for ejecting liquid that is used more frequently than the other kinds of liquids be formed than ejection port arrays for ejecting the other kinds of liquids. For example, it is preferable that more ejection port arrays for ejecting black ink be formed than ejection port arrays for ejecting inks of the other colors. Thus, the print element substrate 201 according to the present embodiment includes the fourth ejection port array 301*d* for ejecting black ink and the fifth ejection port array 301*e* for ejecting black ink.

FIG. 10B is a perspective view of the first pitch conversion member 502, the first channel member 503, and the second channel member 504 in the case of observing the liquid ejection unit 205 from the −Z direction according to the present embodiment. As shown in FIG. 10B, the pitch conversion hole coupled to the fourth individual supply channel 803*d* for supplying black ink is formed larger than the pitch conversion holes for supplying the other inks. Similarly, the pitch conversion hole coupled to the fourth individual collection channel 804*d* for collecting black ink is formed larger than the pitch conversion holes for collecting the other inks. This is because it is necessary to couple the pitch conversion hole for supplying black ink and the pitch conversion hole for collecting black ink to the ejection port 301 of the fourth ejection port array 301*d* and the ejection port 301 of the fifth ejection port array 301*e*.

FIG. 10C is an enlarged view of a region XC shown in FIG. 10B. In FIG. 10C, the size of the first opening 601*a* in the first pitch conversion hole 601 for collecting magenta ink is denoted as "F1." On the other hand, the size of the third opening 602*a* in the second pitch conversion hole 602 for collecting black ink is denoted as "F2." Then, in the present embodiment, the following formula holds.

$$F1<F2 \quad \text{(Formula 2)}$$

This makes it easier to couple the third opening 602*a* of the second pitch conversion hole 602 for collecting black ink to two rows of ejection port arrays than in the case of manufacturing all pitch conversion holes of the same size. The same applies to the pitch conversion hole for supplying black ink.

Figure 11:
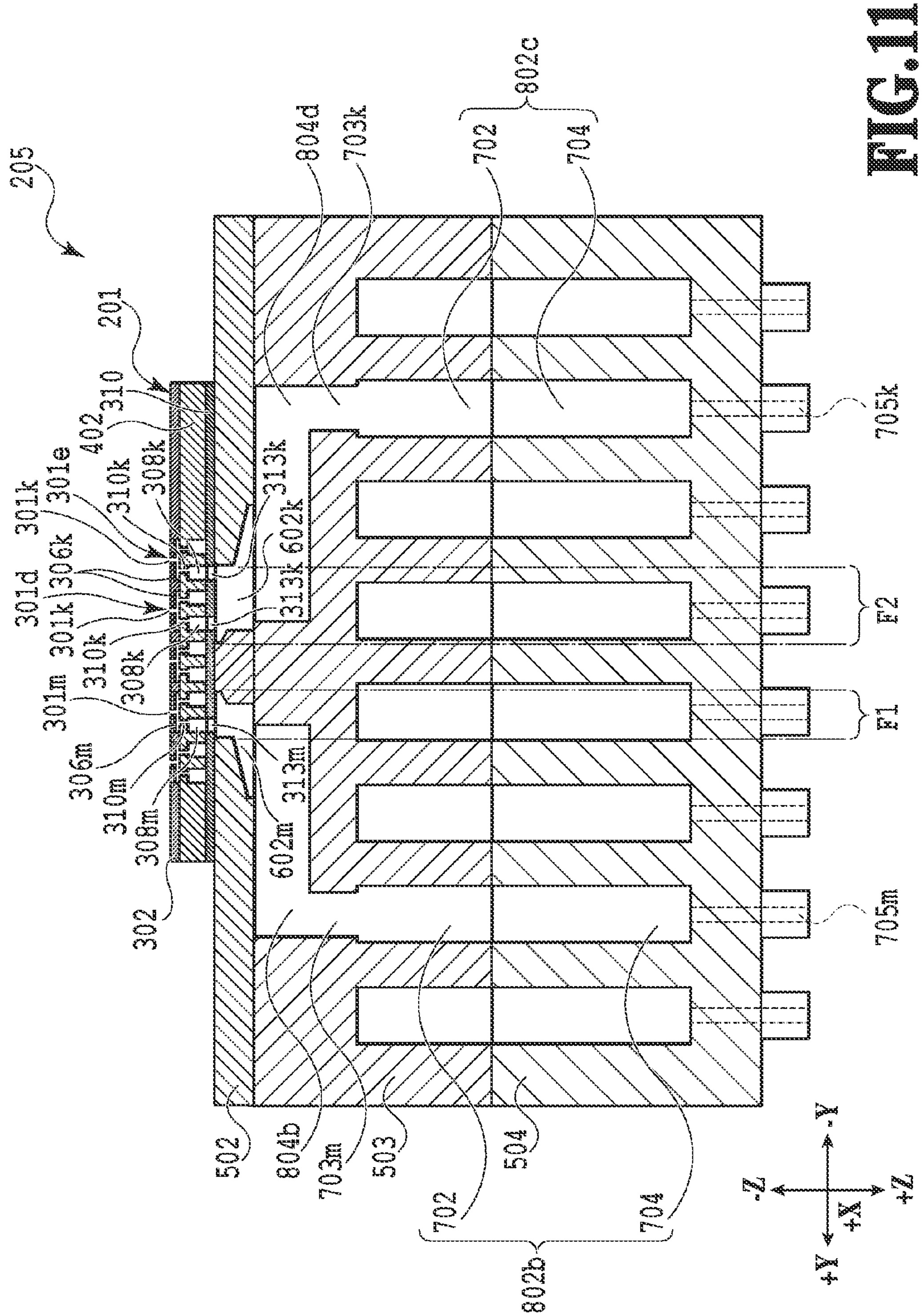
FIG. 11 is a sectional view taken along XI-XI in FIG. 10B.

FIG. 11 is a sectional view taken along XI–XI in FIG. 10B.

As shown in FIG. 11, the pitch conversion hole 602*k* for collecting black ink is coupled to the liquid collection path 308 of the fourth ejection port array 301*d* and the liquid collection path 308 of the fifth ejection port array 301*e*. In another cross section, the pitch conversion hole for supplying black ink is coupled to the liquid supply path 307 of the fourth ejection port array 301*d* and the liquid supply path 307 of the fifth ejection port array 301*e*.

According to the configuration of the present embodiment, ink that has not been ejected from the ejection port 301*k* of the fourth ejection port array 301*d* is collected from the print element substrate 201 into the liquid ejection apparatus 100 body as in the first embodiment. Further, ink that has not been ejected from the ejection port 301*k* of the fifth ejection port array 301*e* flows through the pressure chamber 306*k*, the first collection port 310*k*, the liquid collection path 308*k*, and the second collection port 313*k* in this order into the first pitch conversion member 502. Subsequently, in the first pitch conversion member 502, the ink that has flowed from the second collection port 313*k* of the print element substrate 201 flows through the pitch conversion hole 602*k* into the first channel member 503. Then, in the first channel member 503 and the second channel member 504, the ink that has flowed from the pitch conversion hole 602*k* returns to the liquid ejection apparatus 100 body through the fourth individual collection channel 804*d*, the coupling port 703*k*, the fourth common collection channel 802*d*, and the coupling port 705*k* in this order. It should be noted that the width (the length in the Y direction) of the ejection port array is very small, and even in a case where the number of ejection port arrays is larger than in the first embodiment, a sufficient adhesive-application region in the print element substrate 201 is secured.

Accordingly, even in a case where an air bubble is generated in two rows of liquid collection paths 308 or liquid supply paths 307, the air bubble can be released quickly. Thus, even in the case of increasing the number of ejection port arrays, the technique according to the present disclosure can provide a liquid ejection head that is more reliable than conventional ones.

Third Embodiment

A third embodiment according to the technique of the present disclosure will be described below with reference to the drawings. In the following description, the same reference numeral is given to a feature identical or corresponding to that in the first embodiment, the description thereof is omitted, and a different respect is mainly described.

In recent years, larger page-wide liquid ejection heads for commercial or industrial printing applications are required to have higher-speed and higher-quality printing performance. In order to achieve this, it is important to increase positional accuracy between a plurality of print element substrates.

However, as the width (the length in the X direction) of the liquid ejection head becomes greater, that of each member forming the liquid ejection unit also becomes greater, and there is a possibility that the warpage or undulation of the liquid ejection unit may also become larger. That is, it can be said that the longer the liquid ejection head becomes, the more difficult it becomes to sufficiently satisfy the tolerance of the positional accuracy in a plurality of print element substrates. For example, with a plurality of print element substrates arranged adjacent to each other along the longitudinal direction of the liquid ejection head, a distance from the ejection port of each print element substrate to a print medium differs for each print element substrate. In this case, since time after liquid is ejected until the liquid lands on the print medium differs for each print element substrate, the positions of dots formed on the print medium conveyed at a constant speed differ in a conveyance direction depending on the print element substrate. That is, in a case where the positional accuracy between a plurality of print element substrates is low, there is a possibility that unevenness will occur in printing, resulting in deterioration of an output image.

Thus, an object of the present embodiment is to provide a liquid ejection head that is more reliable than the liquid ejection head according to the first embodiment.

Figure 12:
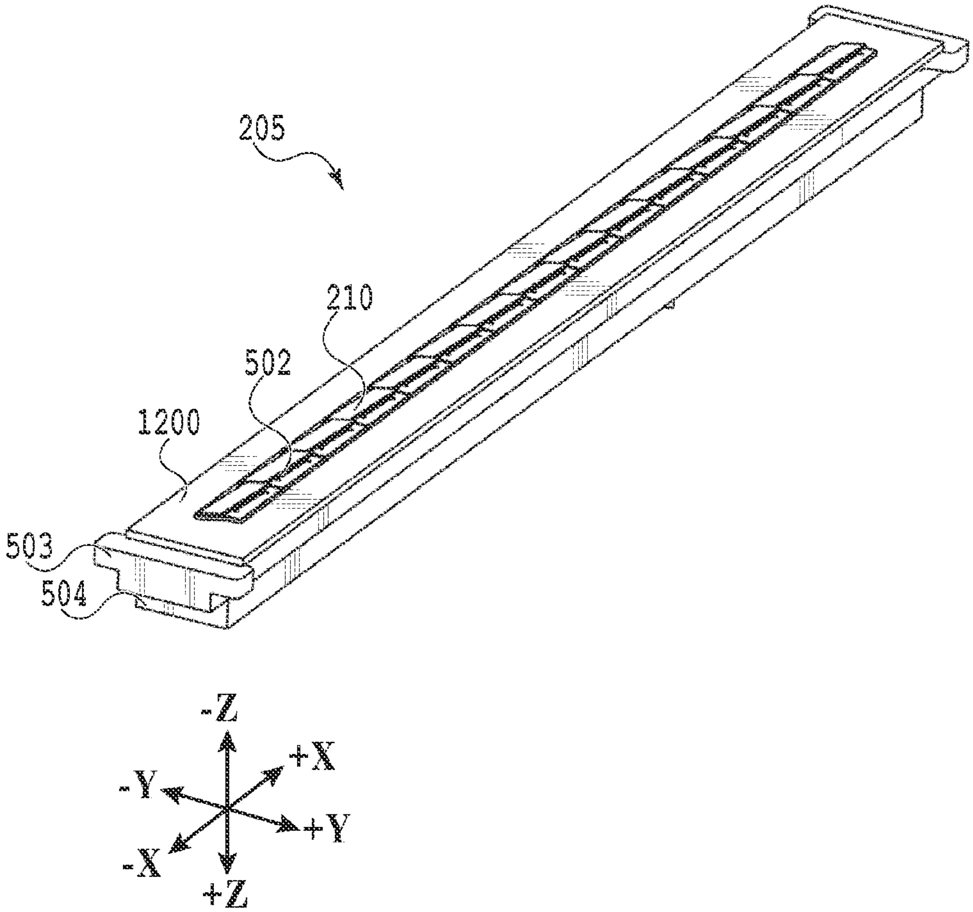
FIG. 12 is a perspective view of the liquid ejection unit according to one embodiment.

FIG. 12 is a perspective view of the liquid ejection unit according to the present embodiment.

As shown in FIG. 12, the liquid ejection unit 205 according to the present embodiment is different from that according to the first embodiment in that one print element substrate 201 is attached to one first pitch conversion member 502.

Figure 13A:
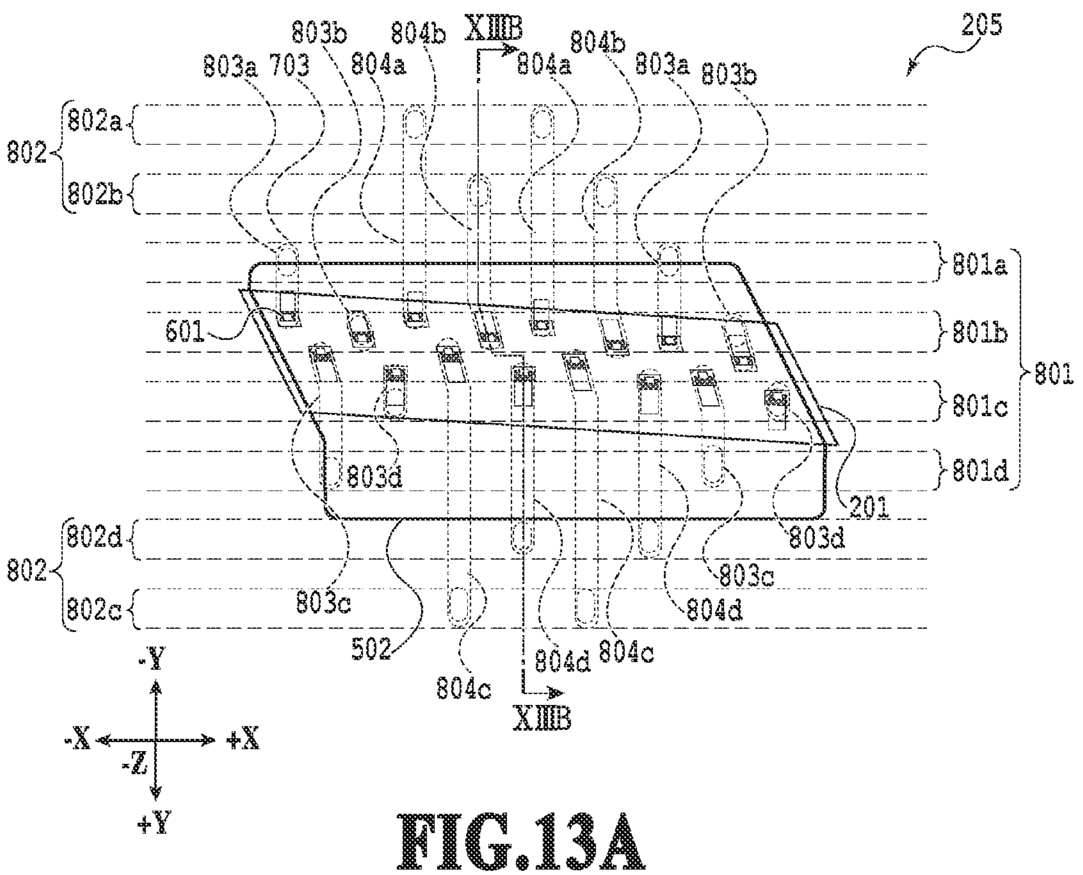
FIGS. 13A and 13B are schematic diagrams of the liquid ejection unit according to one embodiment.
Figure 13B:
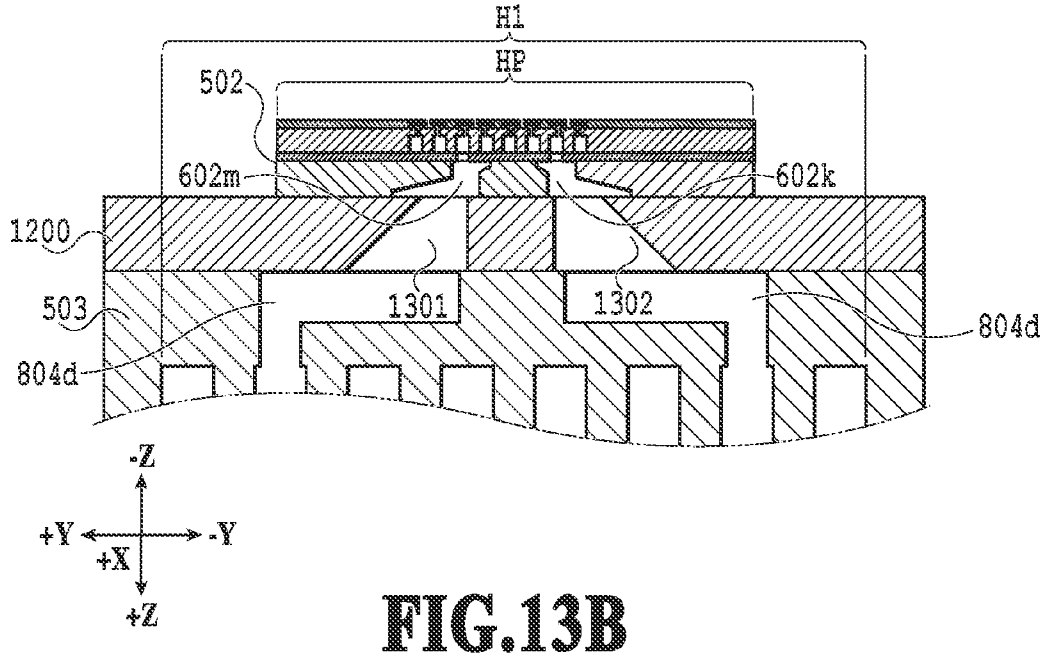

FIGS. 13A and 13B are schematic diagrams of the liquid ejection unit 205 according to the present embodiment.

The pitch conversion member included in the liquid ejection unit 205 according to the present embodiment is different from that according to the first embodiment in including the first member coupled to the print element substrate 201 and the second member arranged between the first member and the channel member.

FIG. 13A is a perspective view of the first pitch conversion member 502, the second pitch conversion member 1200, the first channel member 503, and the second channel member 504 in the case of observing the liquid ejection unit 205 according to the present embodiment from the −Z direction.

As shown in FIG. 13A, in the present embodiment, one print element substrate 201 is arranged in one first pitch conversion member 502. In the present embodiment, considering heat dissipation effects, it is preferable that materials forming the first pitch conversion member 502 include a material having a higher thermal conductivity than that of resin. Examples of a suitably-usable material include ceramic (e.g., alumina). This is because the first pitch conversion member 502 made of materials including ceramic functions as a temperature-equalizing plate for the print element substrate 201. Further, by polishing the first pitch conversion member 502 made of materials including ceramic, the flatness of the first pitch conversion member 502 is larger than in a case where the first pitch conversion member 502 is made of resin. Such a configuration makes it possible to easily increase the flatness of the binding surface between the first pitch conversion member 502 and the print element substrate 201. It is also possible to reduce the amount of an adhesive applied in the case of bonding the first pitch conversion member 502 and the print element substrate 201. Thus, it is possible to suppress the adhesive from overflowing and clogging the second supply port 312, the second collection port 313, and the pitch conversion port of the print element substrate 201.

Moreover, it is desirable that the print element substrates 201 and the first pitch conversion members 502 be arranged at regular intervals in the longitudinal direction of the liquid ejection head 102. In a case where each print element substrate 201 and each first pitch conversion member 502 have the same shape and are arranged at regular intervals, the cost of processing can be made lower than in a case where the print element substrate 201 and the first pitch conversion member 502 have different shapes and are arranged at irregular intervals.

Further, in the case of newly creating page-wide heads with different lengths in the longitudinal direction, it is also not necessary to newly prepare a new first pitch conversion member 502 corresponding to the size of each page-wide head. In other words, it is also possible to handle a case where the number of print element substrates 201 and the number of first pitch conversion members 502 provided in one page-wide head are increased or decreased.

FIG. 13B is a sectional view taken along XIIIB−XIIIB in FIG. 13A.

As shown in FIG. 13B, the liquid ejection unit 205 according to the present embodiment includes a second pitch conversion member 1200, which is the second member in the pitch conversion member, between the first pitch conversion member 502 and the first channel member 503. In the second pitch conversion member 1200, there are formed a third pitch conversion hole 1301 and a fourth pitch conversion hole 1302 whose cross-sectional shape obtained by cutting the second pitch conversion member 1200 in the X direction is trapezoidal. In the illustrated example, the third pitch conversion hole 1301 is coupled to the pitch conversion hole 602*m* for collecting magenta ink with the second pitch conversion member 1200 arranged between the first channel member 503 and the first pitch conversion member 502. Similarly, the fourth pitch conversion hole 1302 is coupled to the pitch conversion hole 602*k* for collecting black ink.

It is preferable that the second pitch conversion member 1200 be made of a material with sufficient corrosion resistance against liquid and a low linear expansion coefficient like the first channel member 503 and the second channel member 504. In addition to the materials described above, examples of a material preferably usable for the second pitch conversion member 1200 include a metal material such as stainless steel (SUS) and aluminum. Specifically, in the case of molding the second pitch conversion member 1200 using a metal material or a ceramic material, the flatness of the bonding surface between the first pitch conversion member 502 and the first channel member 503 can be made larger than in the case of molding using a resin material.

Further, the sizes of the diameters of the third pitch conversion hole 1301 and the fourth pitch conversion hole 1302 may or may not be maintained in the direction in which the second pitch conversion member 1200 is penetrated. For example, the area of an opening formed in the bonding surface with the first channel member 503 in the third pitch conversion hole 1301 is preferably larger than the area of an opening formed in the bonding surface with the first pitch conversion member 502. Such a configuration, even in a case where an air bubble is generated, makes it possible to release the air bubble to a liquid ejection apparatus 100 body side as in the first embodiment. Incidentally, the same applies to the fourth pitch conversion hole 1302. Such a configuration, even in a case where an air bubble is generated, makes it possible to release the air bubble to the liquid ejection apparatus 100 body side as in the first embodiment.

In a case where a length from a channel formed at one end side of the first channel member 503 to a channel formed at the most distal end is longer than the length of the first pitch conversion member 502 in the lateral direction, the second pitch conversion member 1200 may be stacked on the first channel member 503. For example, in the first channel member 503, a length from a channel formed in a most distal end side in the +Y direction in the figure to a channel formed in a most distal end side in the −Y direction is "H1," and the length of the first pitch conversion member 502 in the lateral direction is "HP." In such a case, in a case where the length "H1" is longer than the length "HP," the second pitch conversion member 1200 may be stacked on the first channel member 503. Such a configuration makes it possible to use the second pitch conversion member 1200 as a cover member for forming an individual supply channel and an individual collection channel.

As described above, the liquid ejection unit according to the present embodiment makes it possible to reduce the tolerance of the pitch conversion member in the thickness direction and increase parallelism between the print medium P and the ejection port surface. Thus, the technique according to the present embodiment can provide a liquid ejection head that is more reliable than the liquid ejection head according to the first embodiment.

Other Embodiment

The configurations of the first to third embodiments described above can also be combined with each other.

The configurations of the first to third embodiments described above are not limited to a liquid ejection apparatus using a circulation method of circulating liquid collected from a liquid ejection head in the liquid ejection head again. For example, all channels provided in the liquid ejection head may be used to supply liquid.

In the first to third embodiments, ink is used as an example of the liquid, but the liquid does not have to be ink. For example, various printing liquids may be used including a processing liquid and the like used for the purpose of increasing ink fixability, reducing gloss unevenness, and increasing abrasion resistance on a print medium.

The technique according to the present disclosure can provide a liquid ejection head that is more reliable than conventional ones.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-124087, filed Aug. 3, 2022, which are hereby incorporated by reference herein in its entirety.

What is claimed is:

1. A liquid ejection head configured to eject liquid, the liquid ejection head comprising:

a print element substrate including a plurality of first channels;

a channel member including a plurality of second channels; and a pitch conversion member arranged between the print element substrate and the channel member to convert a first array pitch in a first array direction of the plurality of first channels into a second array pitch in the first array direction of the plurality of second channels, wherein the pitch conversion member includes a plurality of first openings respectively connected to the plurality of first channels, and a plurality of second openings respectively connected to the plurality of second channels, wherein a region where a plurality of the first openings are provided and a region where a plurality of the second openings are provided overlap as viewed from a penetration direction of the first openings and the second openings, wherein a first distance in a second array direction between the two first openings closest to each other in the second array direction intersecting the first array direction is shorter than a second distance in the second array direction between the two second openings closest to each other in the second array direction, wherein a pitch conversion hole including one of the first openings and one of the second opening includes a first region whose diameter is reduced from a bonding surface bonded to the print element substrate in the penetration direction, a second region whose diameter is maintained from the first region in the penetration direction, and a third region whose diameter is increased from the second region in the penetration direction, and wherein an area of the second region in the penetration direction is smaller than areas of the first region and the third region.

2. The liquid ejection head according to claim 1, wherein an area of a portion where one of the first openings and one of the second openings overlap is 100 μm2 or more.

3. The liquid ejection head according to claim 1, wherein the distance between the second openings is greater than the distance between the first openings by 10 μm or more.

4. The liquid ejection head according to claim 1, wherein flatness of a bonding surface bonded to the print element substrate in the pitch conversion member is 10 μm or less.

5. The liquid ejection head according to claim 1, wherein flatness of a bonding surface bonded to the channel member in the pitch conversion member is 10 μm or less.

6. The liquid ejection head according to claim 1, wherein a number of the first channels is greater than a number of the second channels, and a portion of a plurality of the pitch conversion holes couples one of the second channels to a plurality of the first channels.

7. The liquid ejection head according to claim 1, wherein a plurality of the print element substrates are arranged linearly, and the first array direction intersects the second array direction.

8. The liquid ejection head according to claim 1, wherein a material forming the pitch conversion member includes a metal material.

9. The liquid ejection head according to claim 1, wherein a plurality of the pitch conversion holes include a first pitch conversion hole for supplying the print element substrate with a predetermined liquid and a second pitch conversion hole for collecting the predetermined liquid from the print element substrate.

10. The liquid ejection head according to claim 1, wherein the pitch conversion member includes a first member coupled to the print element substrate and a second member arranged between the first member and the channel member, the first member converts the first array pitch into a predetermined pitch, and the second member converts the predetermined pitch into the second pitch.

11. The liquid ejection head according to claim 10, wherein a material forming the second member includes a metal material.

12. A liquid ejection apparatus comprising:

a liquid ejection head configured to eject liquid and comprising a print element substrate including a plurality of first channels; a channel member including a plurality of second channels; and a pitch conversion member arranged between the print element substrate and the channel member to convert a first array pitch in a first array direction of the plurality of first channels into a second array pitch in the first array direction of the plurality of second channels, wherein the pitch conversion member includes a plurality of first openings respectively connected to the plurality of first channels, and a plurality of second openings respectively connected to the plurality of second channels, wherein a region where a plurality of the first openings are provided and a region where a plurality of the second openings are provided overlap as viewed from a penetration direction of the first openings and the second openings, and wherein a first distance in a second array direction between the two first openings closest to each other in the second array direction intersecting the first array direction is shorter than a second distance in the second array direction between the two second openings closest to each other in the second array direction;

a control unit configured to control the liquid ejection head; and a liquid feed unit configured to supply the liquid ejection head with liquid, wherein a pitch conversion hole including one of the first openings and one of the second opening includes a first region whose diameter is reduced from a bonding surface bonded to the print element substrate in the penetration direction, a second region whose diameter is maintained from the first region in the penetration direction, and a third region whose diameter is increased from the second region in the penetration direction, and wherein an area of the second region in the penetration direction is smaller than areas of the first region and the third region.

13. A liquid ejection head configured to eject liquid, the liquid ejection head comprising:

a print element substrate including a plurality of first channels;

a channel member including a plurality of second channels; and a pitch conversion member arranged between the print element substrate and the channel member to convert a first array pitch in a first array direction of the plurality of first channels into a second array pitch in the first array direction of the plurality of second channels, wherein the pitch conversion member includes a plurality of first openings respectively connected to the plurality of first channels, and a plurality of second openings respectively connected to the plurality of second channels, wherein a region where a plurality of the first openings are provided and a region where a plurality of the second openings are provided overlap as viewed from a penetration direction of the first openings and the second openings, wherein a first distance in a second array direction between the two first openings closest to each other in the second array direction intersecting the first array direction is shorter than a second distance in the second array direction between the two second openings closest to each other in the second array direction, and wherein a plurality of a pitch conversion holes include a first pitch conversion hole for supplying the print element substrate with a predetermined liquid and a second pitch conversion hole for collecting the predetermined liquid from the print element substrate.

* * * * *